United States Patent [19]
Nishimura et al.

[11] Patent Number: 5,784,220
[45] Date of Patent: Jul. 21, 1998

[54] MAGNETIC DISK APPARATUS, RECORDING AND ACCESSING METHOD FOR PERFORMING DENSITY RECORDING

[75] Inventors: Kazuo Nishimura; Tatsuro Sasamoto; Hideaki Tanaka; Hiroaki Etoh, all of Kawasaki, Japan

[73] Assignee: Fujitsu Limited, Kawasaki, Japan

[21] Appl. No.: 810,726

[22] Filed: Mar. 4, 1997

Related U.S. Application Data

[62] Division of Ser. No. 329,305, Oct. 26, 1994, Pat. No. 5,636,075.

Foreign Application Priority Data

Jan. 20, 1994 [JP] Japan ................... 6-004426

[51] Int. Cl.$^6$ ................................... G11B 5/596
[52] U.S. Cl. ........................... 360/78.14; 360/78.04
[58] Field of Search ........................ 360/78.04, 78.14

[56] References Cited

U.S. PATENT DOCUMENTS

| | | | |
|---|---|---|---|
| 5,018,095 | 5/1991 | Nissimov | 364/900 |
| 5,053,897 | 10/1991 | Ikeshita | 360/77.05 |
| 5,193,034 | 3/1993 | Tsuyoshi et al. | 360/51 |
| 5,331,492 | 7/1994 | Komai et al. | 360/113 |
| 5,341,363 | 8/1994 | Hasaka | 369/275.3 |
| 5,568,606 | 10/1996 | Dobbek | 359/182.06 |

FOREIGN PATENT DOCUMENTS

| | | |
|---|---|---|
| 594674 | 4/1993 | Japan. |
| 5174516 | 7/1993 | Japan. |

Primary Examiner—Aristotelis M. Psitos
Assistant Examiner—Regina Y. Neal
Attorney, Agent, or Firm—Greer, Burns & Crain, Ltd.

[57] ABSTRACT

There is used a disk medium in which tracks are divided into a plurality of zones in the radial direction and information is read and written with a constant linear density by using a clock signal of a different frequency every zone. A drive unit forms a dead space corresponding to at least one track at a zone boundary of the disk medium and reads or writes the information. In the case where it is judged that the head passes through the zone boundary by the seeking operation to the cylinder address position instructed from an upper apparatus, the cylinder address instructed from the upper apparatus is corrected on the basis of the number of boundary passing times and the seeking operation is performed.

3 Claims, 20 Drawing Sheets

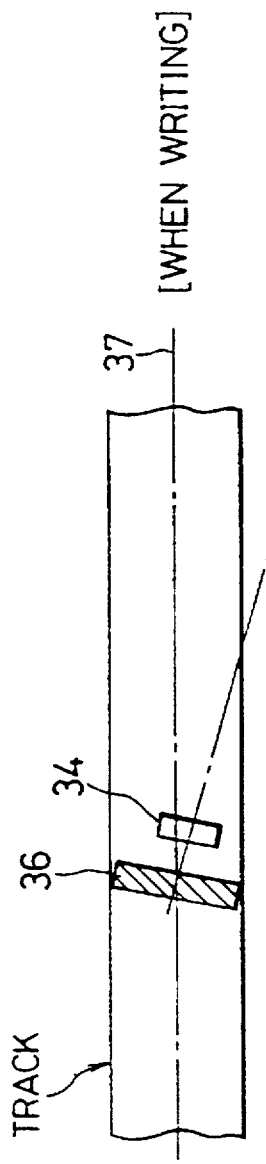
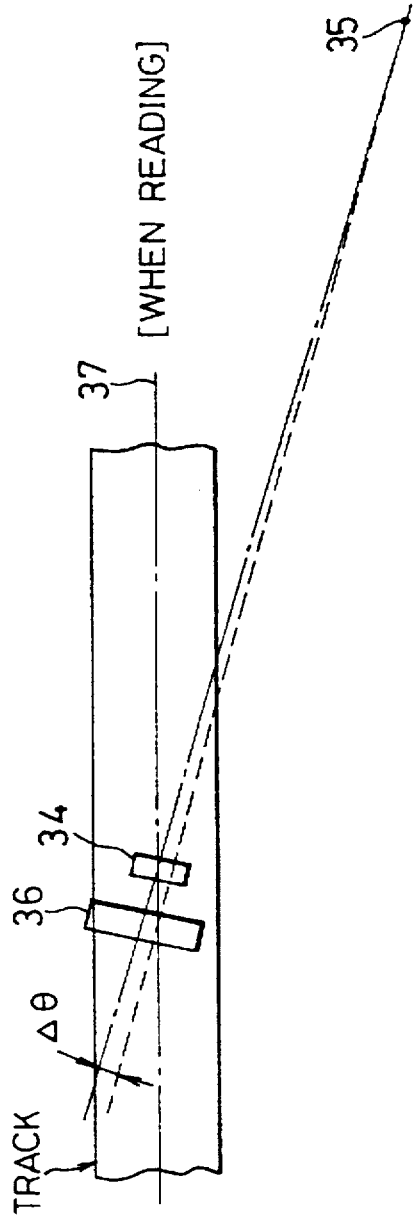
FIG. 4A PRIOR ART
FIG. 4B PRIOR ART

FIG. 13

| ZONE No. | LOGICAL CYLINDER ADDRESS | PHYSICAL CYLINDER ADDRESS | CORRECTION VALUE |
|---|---|---|---|
| Z1 | 1<br>2<br>3<br>⋮<br>m | 1<br>2<br>3<br>⋮<br>m | 0 |
| ZONE BOUNDARY VACANT SPACE | | m+1<br>⋮<br>m+α | |
| Z2 | m+1<br>m+2<br>m+3<br>⋮<br>2m | (m+1)+α<br>(m+2)+α<br>(m+3)+α<br>⋮<br>2m+α | α |
| ZONE BOUNDARY VACANT SPACE | | (2m+α)+1<br>⋮<br>(2m+α)+α | |
| Z3 | 2m+1<br>2m+2<br>2m+3<br>⋮<br>3m | (2m+1)+2α<br>(2m+2)+2α<br>(2m+3)+2α<br>⋮<br>3m+2α | 2α |
| Zn | (n−1)m+1<br>(n−1)m+2<br>(n−1)m+3<br>⋮<br>nm | {(n−1)m+1}+(n−1)α<br>{(n−1)m+2}+(n−1)α<br>{(n−1)m+3}+(n−1)α<br>⋮<br>nm+(n−1) | (n−1)α | m : THE NUMBER OF CYLINDERS PER ZONE
n : THE NUMBER OF ZONES
α : THE NUMBER OF DUMMY CYLINDERS PER ONE ZONE

FIG. 14

| ZONE No. | LOGCAL CYLINDER ADDRESS | PHYSICAL CYLINDER ADDRESS |
|---|---|---|
| Z1 | 1<br>2<br>3<br>⋮<br>m | 1<br>2<br>3<br>⋮<br>m |
| Z2 | m+1<br>m+2<br>m+3<br>⋮<br>2m | m+2<br>m+3<br>m+4<br>⋮<br>2m+1 |
| Z3 | 2m+1<br>2m+2<br>2m+3<br>⋮<br>3m | 2m+3<br>2m+4<br>2m+5<br>⋮<br>3m+2 |
| Zn | (n−1)m+1<br>(n−1)m+2<br>(n−1)m+3<br>⋮<br>nm | {(n−1)m+1} + (n−1)<br>{(n−1)m+2} + (n−1)<br>{(n−1)m+3} + (n−1)<br>⋮<br>nm + (n−1) | m : THE NUMBER OF CYLINDERS PER ZONE
n : THE NUMBER OF ZONES
α : THE NUMBER OF DUMMY CYLINDERS PER ONE ZONE

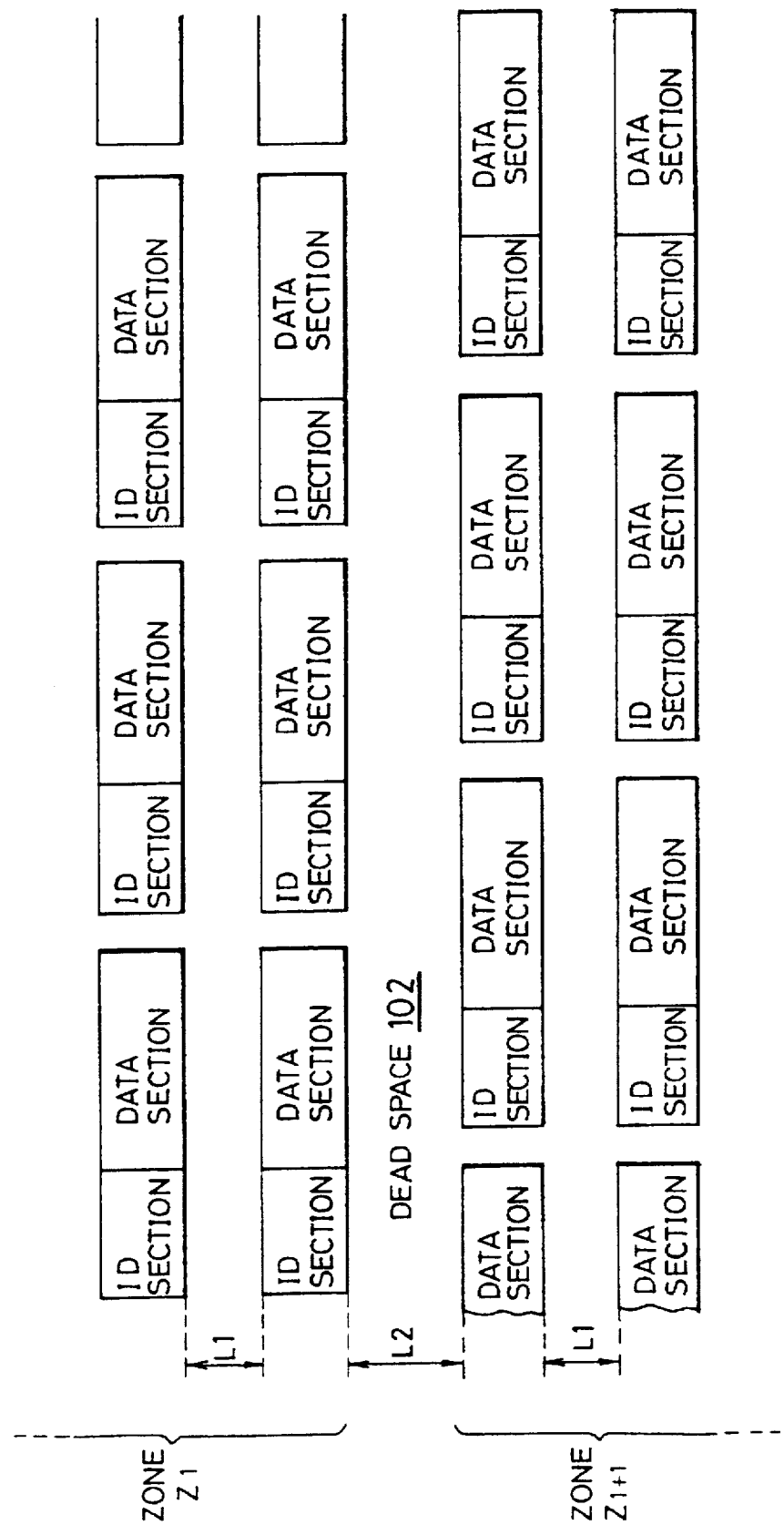

MAGNETIC DISK APPARATUS, RECORDING AND ACCESSING METHOD FOR PERFORMING DENSITY RECORDING

This is a divisional of application Ser. No. 8/329,305 filed on Oct. 26, 1994, now U.S. Pat. No. 5,636,075.

BACKGROUND OF THE INVENTION

The invention relates to magnetic disk apparatus, recording medium, and medium accessing method using a constant density recording system and, more particularly, to magnetic disk apparatus, recording medium, and medium accessing method which can perform a high density recording by reducing a track pitch.

In association with the recent requirements for a large capacity, a high processing speed, a low price, and a miniaturization of a computer system, a large capacity, a high processing speed, a low price, and a miniaturization-are also realized with respect to a magnetic disk apparatus. Among them, to obtain both large capacity and small size, it is necessary to raise a recording density of a disk medium. For this purpose, a constant density recording system (hereinafter, referred to as a "CDR") in which a linear density of the information recording in the track direction is made constant is used. Further, a track pitch is reduced.

Hitherto, in a magnetic disk apparatus using the CDR, as shown in FIG. 1, a disk medium is CDR formatted. According to a disk medium 10 which has been CDR formatted, tracks formed in the circumferential direction are divided into a plurality of zones in the radial direction and a clock signal of a different frequency is used every zone, so that information is read and written at a constant linear velocity. Each track is divided into sectors in the circumferential direction by using an index 11 as a reference.

FIG. 2 shows a head mechanism to read and write disk medium 10. The disk medium 10 is rotated by a spindle motor. A head 12 is attached to an edge of a head arm 28 and is turned in the direction which traverses the tracks in the circumferential direction by a voice coil motor (hereinafter, referred to as a "VCM") 26 comprising fixed magnetic circuits 30 and movable coils 32. A write head and a read head are provided for the head 12.

Since a dead space 17 is provided between the tracks as shown in FIG. 3, a track pitch on the disk medium 10 is set to be wider than, for example, a core width W of a write head 36. The dead space 17 is used to prevent a situation such that even when the head is positioned to the center of the track, a positional deviation occurs to a certain degree by a seeking operation, a vibration from the outside, or the like, the write head 36 is projected to the adjacent track, and data is erased. A width of dead space 17 is ordinarily set to a value of about ⅕ to ¼ of the core width W of the write head 36.

To realize the high density recording in the magnetic disk apparatus, it is sufficient to reduce the track pitch of the disk medium as much as possible. For example, a method of eliminating the dead space between the tracks is considered. However, the dead space between the tracks is provided by the following reasons and cannot be omitted.

First, a write head using a magnetic head and a smaller read head using a magnetoresistive device are provided for a recent head. In case of constructing the head by only the read head, by using the magnetoresistive device, the core width can be narrowed and even if there is no dead space, data can be read without interfering with the adjacent track. However, since the write head of a large core width is also provided for the head, the dead space cannot be eliminated.

In order to miniaturize the magnetic disk apparatus, the head positioning mechanism cannot help using the rotary type shown in FIG. 2 instead of the rectilinear type. According to the rotary type, the moving direction of the head 12 doesn't always cross the track direction on the disk medium 10 at a right angle and a certain angle exists between those directions due to the track position. At the same time, the centers of the write head and read head are deviated. Therefore, as shown in FIG. 4A, the head is positioned for the rotational center so as to position the write head 36 to a track center 37 in the writing mode. On the other hand, in the reading mode, as shown in FIG. 4B, the head is positioned so as to locate a read head 34 to the track center 37. Therefore, even in the same track, an offset has to be applied to the head positioning mechanism to rotate the rotary shaft 35 controlling the head position upon switching from the writing operation to the reading operation.

Further, according to a CDR format, an ID section in which address information or the like has been written exists before a data section as shown in each track of FIG. 5. When the data section is written, the ID section is first read and the data is subsequently written into the data section. However, since it takes a time to apply an offset to the head positioning mechanism, the ID section is read in a state without an offset as shown in FIG. 4A.

The ID section is generally written onto the disk medium only at the time of the CDR formatting which is executed upon shipping from the factory. Moreover, a large seeking operation is not also executed when the ID section is written. Therefore, no influence is exerted on the ID section of the adjacent track.

In case of using the CDR format, however, since the number of sectors of one circumference differs every zone, at the boundary between, for example, the zone Nos. 1 and 2 in FIG. 5, the ID section of the track of the zone of No. 2 comes to the position adjacent to the data section of the track of the zone of No. 1. Since the writing and reading operations are frequently executed in the data section, there is a high possibility such that an influence is exerted on the ID section of the adjacent track. For example, in the case where the head has been positioned to the track of the zone No. 1 which is in contact with the zone boundary in FIG. 5 and writing operation has been performed, the head relatively moves on the track while causing an error due to the seeking operation, vibration, or the like. Therefore, the ID section of the track of the adjacent zone No. 2 is interfered as shown in a hatched portion due to the error by the writing operation of the data section, so that an adverse influence is exerted. Because of such reasons, the dead space provided between the tracks cannot be eliminated and it is difficult to narrow the track pitch any more.

SUMMARY OF THE INVENTION

According to the invention, there are provided a magnetic disk apparatus and a recording medium in which a dead space is minimized and a recording density is raised without losing a role of a dead space between the tracks which is required in a CDR format.

First, a magnetic disk apparatus of the invention uses a disk medium which is constructed in a manner such that a plurality of tracks in which the reading and writing operations can be magnetically performed are formed in the circumferential direction and are divided into a plurality of zones in the radial direction and a clock signal of a different frequency is used every zone, thereby reading and writing information with a constant linear density. The invention further has a drive unit for reading and writing information while forming a dead space corresponding to at least one track at a zone boundary of the disk medium.

The drive unit has a seeking section, a zone boundary discriminating section, and a cylinder address correcting section. The seeking section moves a magnetic head to a target position which is designated by a cylinder address instructed from an upper apparatus. The boundary discriminating section discriminates whether the head passes through the zone boundary by the seeking operation to the cylinder address position instructed from the upper apparatus or not. When the passage of the zone boundary is judged by the boundary discriminating section, the cylinder address correcting section corrects the cylinder address instructed from the upper apparatus on the basis of the number of boundary passing times, thereby updating the target cylinder position of the seeking section. For example, each time the head passes through one zone boundary, the cylinder address correcting section adds or subtracts the number ($\alpha$) of cylinders forming a dead space provided at each zone boundary to/from the cylinder address instructed from the upper apparatus.

The drive unit of the invention comprises a track skew allocating section, a cylinder skew allocating section, a track skew deciding section, and a cylinder skew deciding section. When continuous blocks are read or written, the track skew allocating section allocates the head logical sector of the next track to the position after the final logical sector of the preceding track among the plurality of tracks belonging to the same cylinder by deviating by only a track skew value which is defined by the number of sectors corresponding to the switching time, thereby allowing the reading or writing operation to be executed. When continuous blocks are read or written, the cylinder skew allocating section allocates the head logical sector of the head track in the next cylinder to the position after the final logical sector of the final track in the preceding cylinder between the neighboring cylinders while deviating by only the cylinder skew value which is defined by the number of sectors corresponding to the switching time, thereby allowing the reading or writing operation to be executed.

The track skew deciding section decides the track skew value on the basis of the one-sector time which is decided by a clock frequency of the zone to which each cylinder belongs by a format command at the time of the start of the use of the apparatus. With respect to the switching between the cylinders which belong to the same zone, at the start of the use of the apparatus, the cylinder skew deciding section decides the cylinder skew value on the basis of the one-sector time and one-track seeking time which are determined by the clock frequency of the next zone. With respect to the switching between the neighboring cylinders which sandwich the zone boundary, the cylinder skew value is decided on the basis of the seeking time of a plurality of tracks including the dead spaces provided at the zone boundaries and the one-sector time which is determined by the clock frequency of the next cylinder.

The magnetic disk apparatus of the invention can be also constructed in a manner such that a dead space corresponding to a plurality of tracks is formed at the zone boundary of the disk medium and control information or management information other than the user data is read or written from/to the tracks in the dead space. In this case, the dead space corresponding to at least three tracks is formed at the zone boundary and the control information or management information other than the user data is read or written from/to at least one central track excluding the tracks adjacent to the zones on both sides in the dead space.

On the other hand, the invention is used for a recording medium of a magnetic disk apparatus which is constructed in a manner such that a plurality of tracks in which the reading and writing operations can be magnetically performed are formed in the circumferential direction and are divided into a plurality of zones in the radial direction and information is read and written at a constant linear density by using a clock signal of a different frequency every zone. The invention is characterized in that with respect to such a disk medium, a dead space corresponding to at least one track is formed at the zone boundary. A dead space corresponding to a plurality of tracks is formed at the zone boundary and can be also used to read or write control information or management information other than the user data into the dead space. Specifically speaking, the dead space corresponding to at least three tracks is formed at the zone boundary and at least one track to read or write the control information or management information other than the user data is formed at the center excluding the tracks which are adjacent to the zones on both sides in the dead space. As a disk medium of the invention, the space between the tracks at the zone boundary can be also formed so as to be wider than the space between the tracks in the zone.

The invention also provides an accessing method of a disk medium. A disk medium as a target to be accessed is constructed in a manner such that a plurality of writable tracks are formed in the circumferential direction and are divided into a plurality of zones in the radial direction and information is read or written with a constant linear density by using the clock signal of a different frequency every zone. Further, a dead space corresponding to at least one track is formed at the boundary of each zone on the disk medium.

A disk medium accessing method of the invention comprises: a seeking step of moving a magnetic head to a target cylinder position which is designated by a cylinder address instructed from an upper apparatus; a boundary discriminating step of discriminating whether the head passes through the zone boundary by the seeking to the cylinder address position instructed from the upper apparatus or not; and a cylinder address correcting step of correcting the cylinder address instructed from the upper apparatus on the basis of the number of boundary passing times and updating the target cylinder position when the passage of the zone boundary is discriminated.

In the cylinder address correcting step, each time the head passes through one zone boundary, the number of cylinders forming a dead space provided at each zone boundary is added or subtracted to/from the cylinder address instructed from the upper apparatus.

A disk medium accessing method of the invention comprises: a track skew allocating step of allocating a head logical sector of a next track to the position after a final logical sector of the preceding track among a plurality of tracks belonging to the same cylinder while deviating by only a track skew value which is defined by the number of sectors corresponding to a switching time, thereby allowing a reading or writing operation to be executed; a cylinder skew allocating step of allocating a head logical sector of a head track in a next cylinder to the position after a final logical sector of a final track in a preceding cylinder between neighboring cylinders while deviating by only a cylinder skew value which is defined by the number of sectors corresponding to a switching time, thereby allowing a reading or writing operation to be executed; a track skew value deciding step of deciding the track skew value on the basis of a one-sector time which is determined by a clock frequency of the zone to which each cylinder belongs at the time of the start of the use of the apparatus; and a cylinder skew value deciding step of deciding the cylinder skew value on the basis of the one-sector time and a one-track seeking time which are determined by the clock frequency of the zone with respect to the switching between the cylinders belonging to the same zone at the time of the start of the use of the apparatus and deciding the cylinder skew value on the basis of a seeking time of a plurality of tracks including a dead space provided at a zone boundary and the one-sector time which is determined by the clock frequency of the next cylinder with respect to the switching between the neighboring cylinders which sandwich the zone boundary.

According to the accessing method of the invention, further, a dead space corresponding to a plurality of tracks is formed at the zone boundary of the disk medium and control information or management information other than the user data is read or written from/to the tracks in the dead space. In this case, a dead space corresponding to at least three tracks is formed in the zone boundary of the disk medium and the control information or management information other than the user data is read or written from/to at least one central track excluding the tracks adjacent to the zones on both sides in the dead space.

According to the invention as mentioned above, the enough dead space is provided at the zone boundary having a possibility such that it exerts an influence on the ID section of the neighboring tracks in the CDR format. With respect to the track boundary in the zone in which the ID sections in the neighboring tracks are aligned and which doesn't exert an influence, by minimizing the dead space, the track pitch is narrowed and the recording density can be improved.

The above and other objects, features, and advantages of the present invention will become more apparent from the following detailed description with reference to the drawings.

BRIEF DESCRIPTION OF THE DRAWINGS

FIGS. 4A and 4B are explanatory diagrams of offsets of a write head and a read head for the track center;

FIG. 13 is an explanatory diagram of a cylinder address conversion table for use in the invention;

FIG. 14 is an explanatory diagram of a cylinder address conversion table in the case where the number of boundary dummy cylinders is equal to 1;

FIG. 20 is an explanatory diagram for a track format of the third embodiment according to the invention in which a dead space at the zone boundary is widened.

DETAILED DESCRIPTION OF THE PREFERRED EMBODIMENTS

Figure 1:
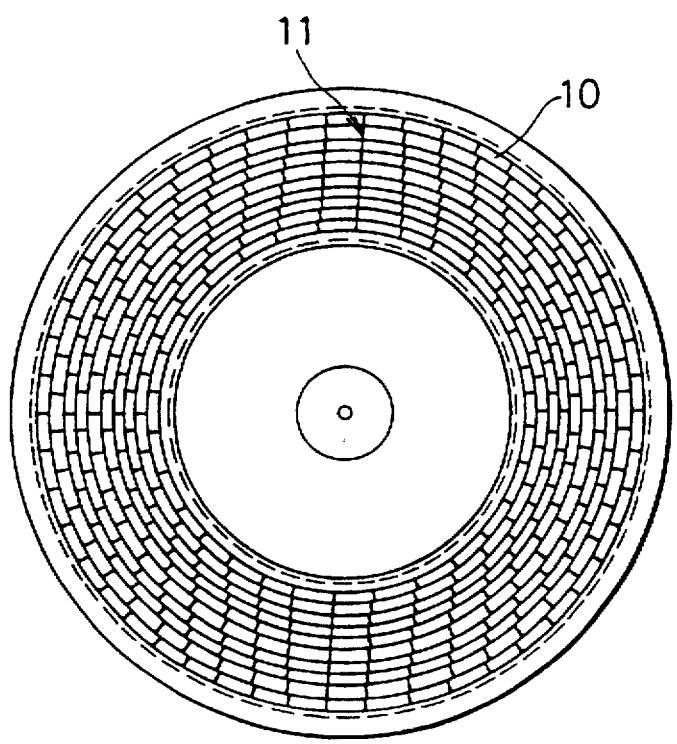
FIG. 1 is an explanatory diagram of a disk medium showing a zone dividing state by a CDR format.
Figure 2:
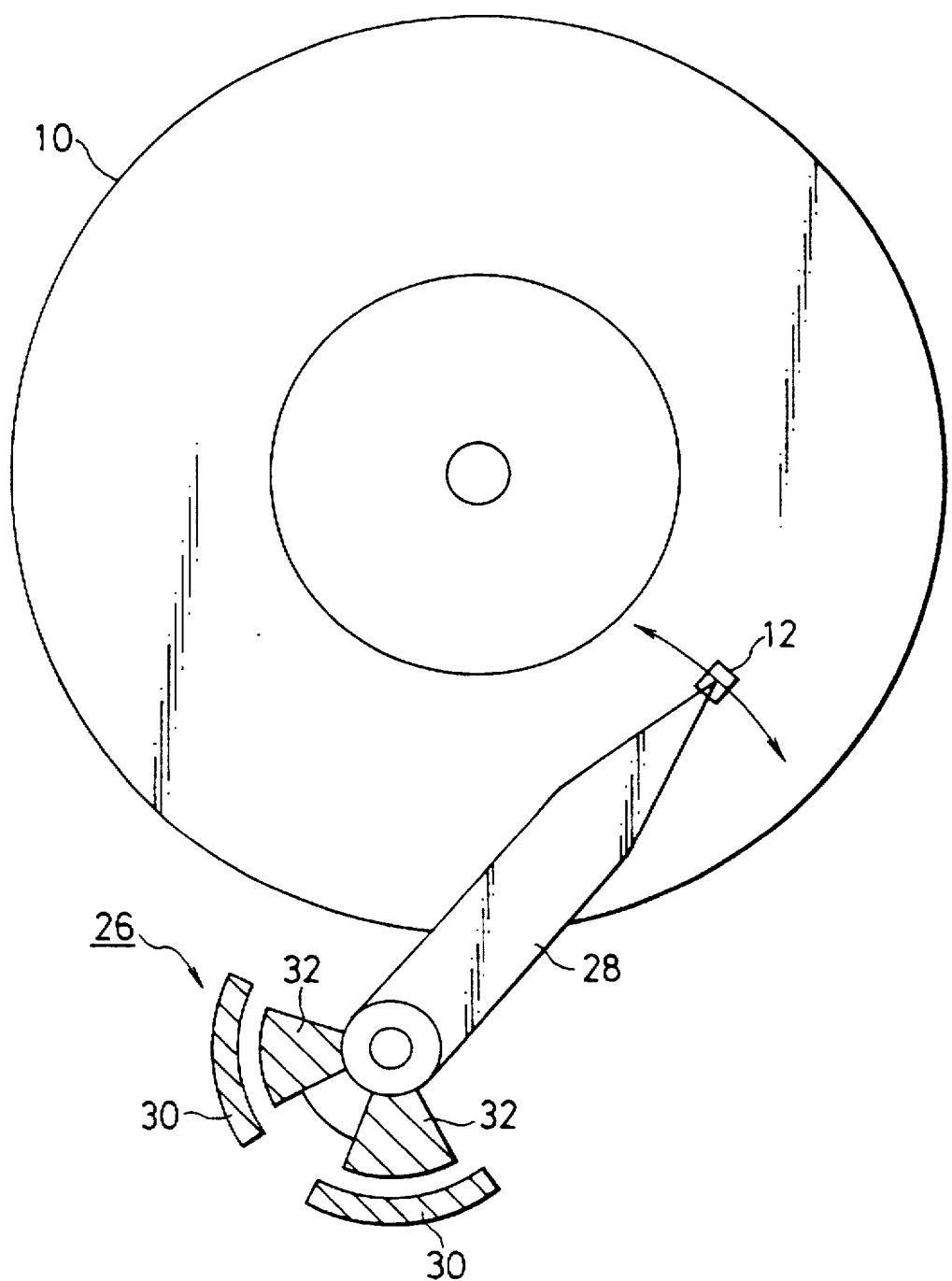
FIG. 2 is an explanatory diagram of a rotary type head positioning mechanism.
Figure 3:
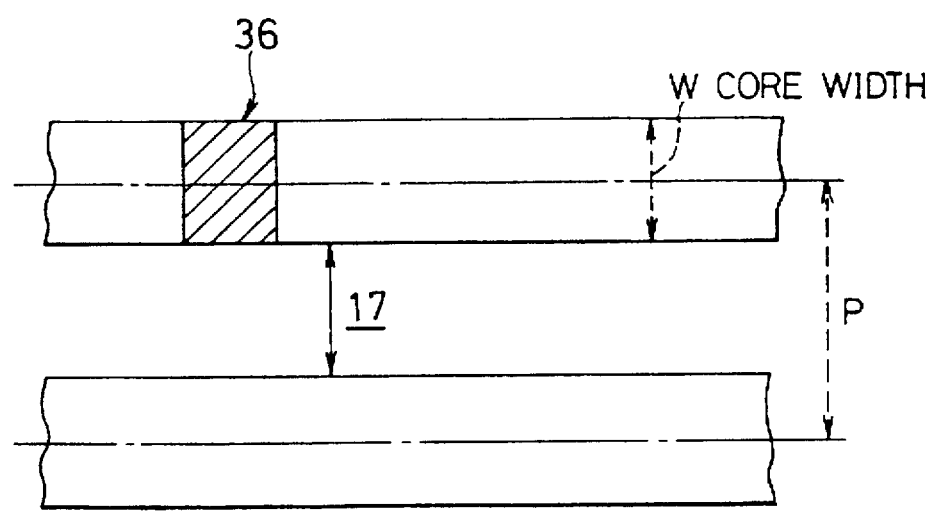
FIG. 3 is an explanatory diagram of a track pitch and a dead space provided between tracks.
Figure 5:
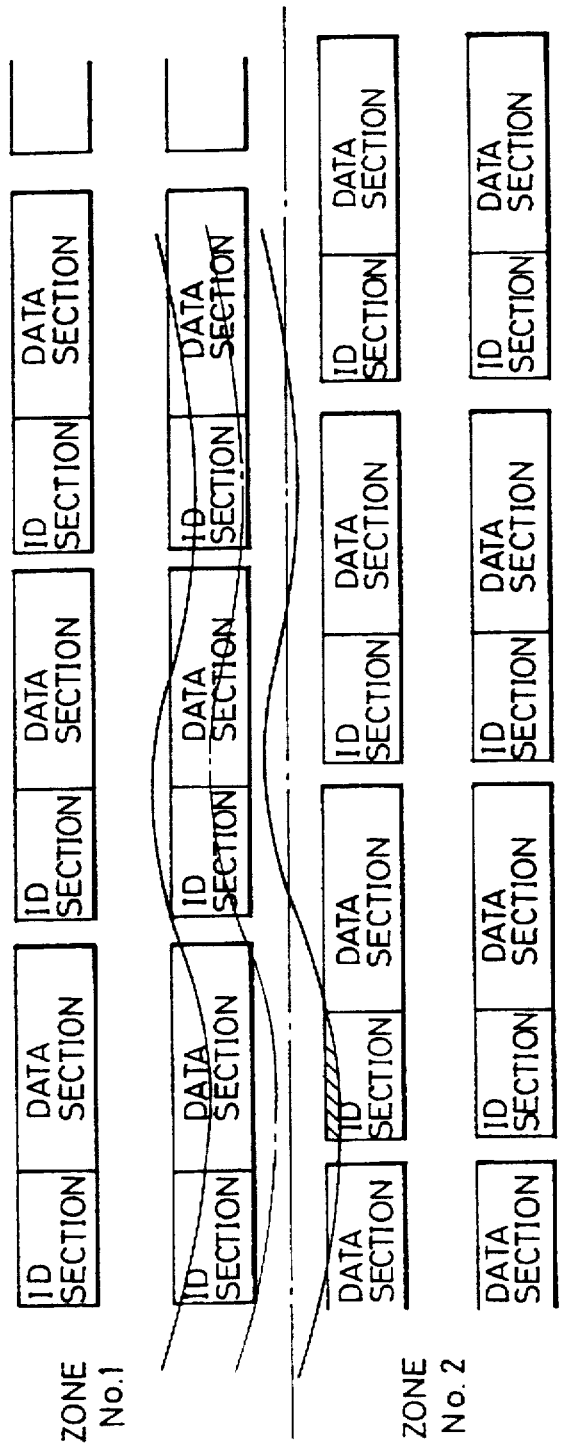
FIG. 5 is an explanatory diagram of the positional relation between an ID section and a data section at a zone boundary in the CDR format.
Figure 6:
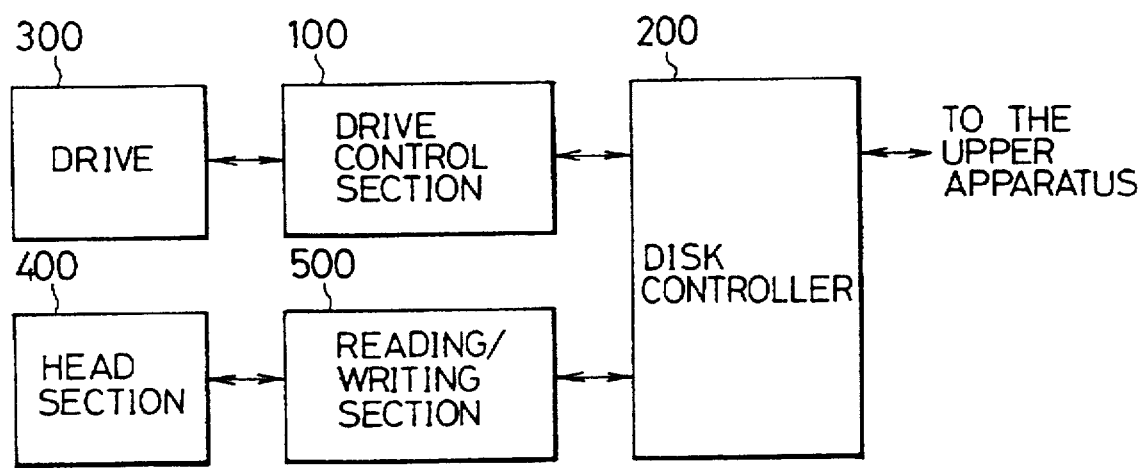
FIG. 6 is a schematic block diagram of the invention.

FIG. 6 is a diagram schematically showing a magnetic disk apparatus of the invention. A drive unit of the invention comprises: a drive control section 100; a disk controller 200; a drive 300 provided under the domination of the drive control section 100; a head section 400; and a reading/writing section 500. When a command and a command parameter are received from an upper host computer, the disk controller 200 sets a cylinder address derived from the command parameter into the drive control section 100. The drive control section 100 moves a head to a target cylinder address by the seeking operation of a head positioning mechanism provided for the drive 300. After completion of the seeking operation, the drive control section 100 switches a control mode to an on-track control mode in which the head is traced onto the track of the target cylinder address by the drive 300 through the head section 400. In the on-track control mode, the reading/writing section 500 performs the reading or writing operation to the disk medium through the head section 400. Write data for the reading/writing section 500 is supplied from an upper apparatus through the disk controller 200. The read data read out by the head section 400 is transferred to the upper apparatus via the disk controller 200.

Figure 7:
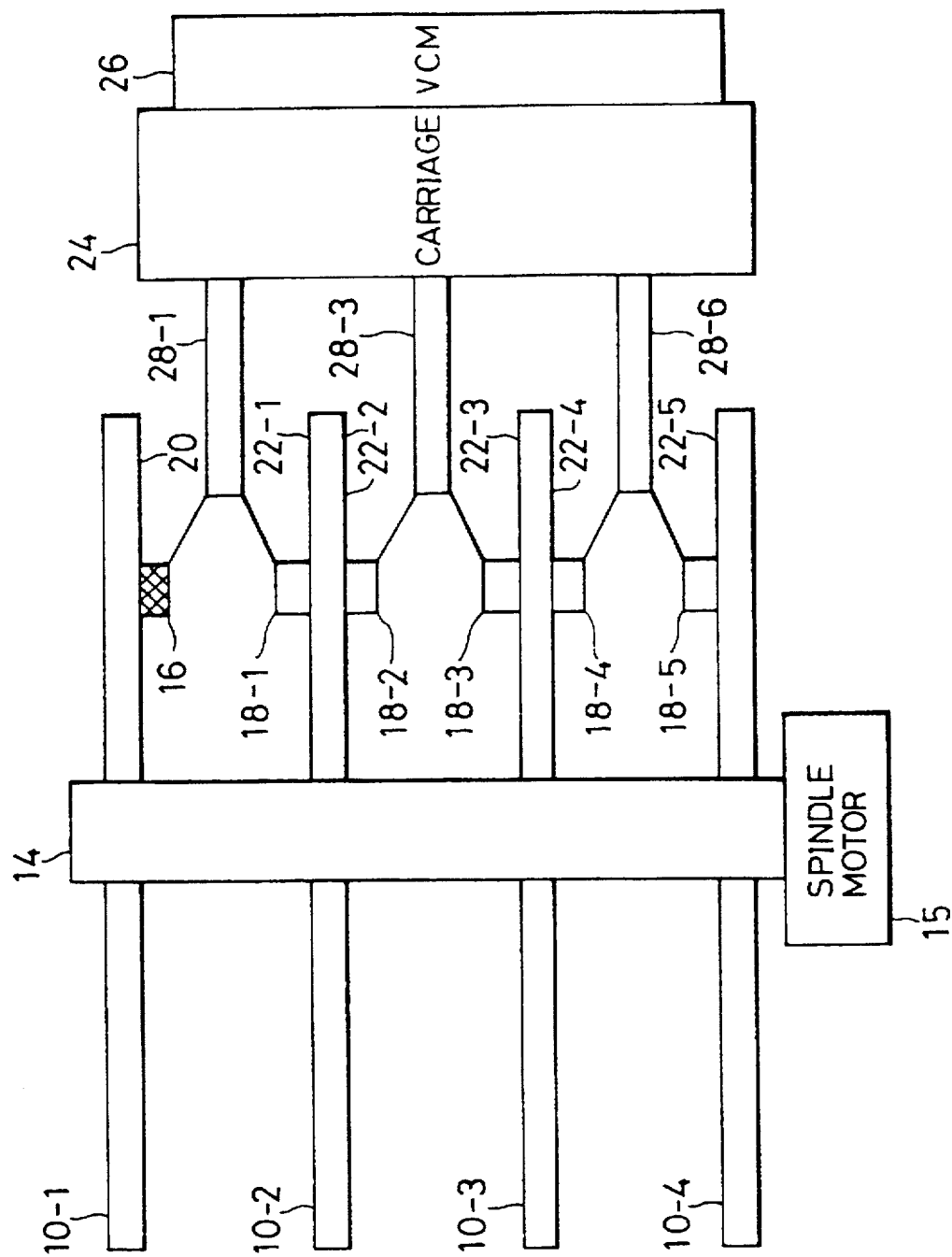
FIG. 7 is an explanatory diagram of a mechanism structure of a drive in FIG. 6.

FIG. 7 is a diagram showing a schematic structure of the drive 300 and head section 400 in FIG. 6. For example, four disk media 10-1 to 10-4 are attached to a spindle 14 of a spindle motor 15 and are rotated. The top disk medium 10-1 has a servo surface 20 on the inside. Track information is recorded on the servo surface 20. The other remaining disk media 10-2 to 10-4 have data surfaces 22-1 to 22-5. A servo head 16 is arranged for the servo surface 20. Data heads 18-1 to 18-5 are arranged for the data surfaces 22-1 to 22-5, respectively. Every two of the servo head 16 and data heads 18-1 to 18-5 are attached to the tips of head arms 28-1 to 28-3, respectively. As will be obviously explained hereinlater, each of the data heads 18-1 to 18-5 has a write head using a magnetic head and a small read head using a magnetoresistive device. The head arms 28-1 to 28-3 are attached to a carriage 24 and are turned by the VCM 26 around the carriage 24 as a center in the direction such that it traverses the tracks on the medium surface.

7

Figure 8:
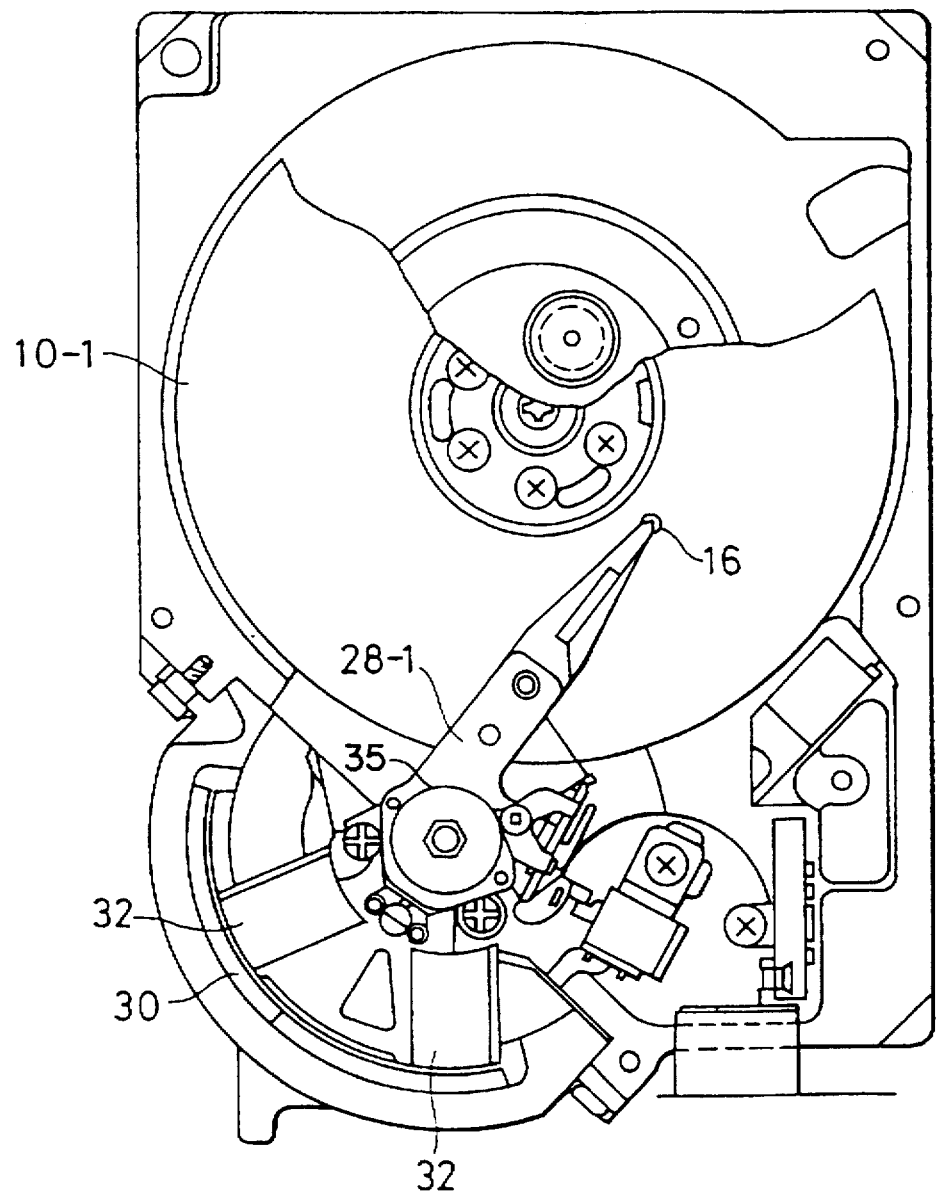
FIG. 8 is an explanatory diagram of a structure of an apparatus of the invention.

FIG. 8 shows a practical structure of the drive and the head section of the invention with a part cut away. For the disk medium 10-1 which is rotated by the spindle motor, a head, in this case, the servo head 16 is attached to the edge of the head arm 28-1 which is turned by a rotary shaft 35. The carriage 24 is constructed by the magnetic circuits 30 on the fixed side and the movable coils 32 provided on the head arm 28-1 side. The head arm 28-1 is rotated around the rotary shaft 35 as a center in the range of the medium surface of the disk medium 10-1. Tracks according to the CDR format are formed on the servo surface 20 and data surfaces 22-1 to 22-5 of the disk media 10-1 to 10-4 in FIG. 7. In the CDR format, at the stage of the end of the final assembly of the magnetic disk apparatus in FIG. 8, an exclusive-use formatting machine is used and a formatting according to the CDR is performed to each disk surface of the disk media 10-1 to 10-4 loaded in the magnetic disk apparatus. According to the CDR format, a plurality of tracks formed in the circumferential direction of the disk medium surface are divided into a plurality of zones in the radial direction. For example, in case of using a disk medium of 3.5 inches, a medium use width on the disk surface is equal to about 30 mm. The medium use width is divided into ten CDR zones in the radial direction and a formatting is executed so as to equalize the number of sectors in the track direction in each zone.

Figure 9:
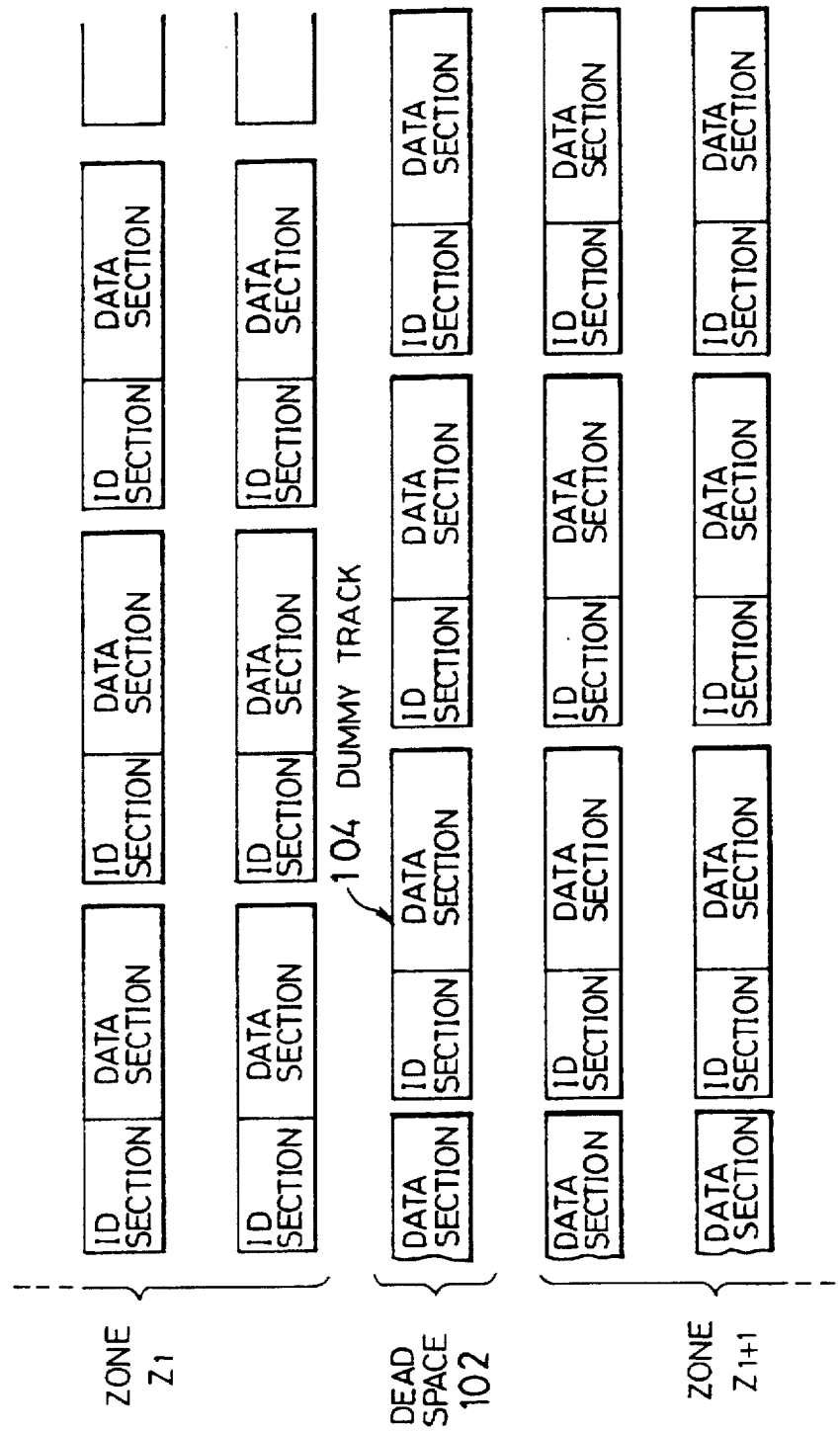
FIG. 9 is an explanatory diagram of a track format of a zone boundary according to the invention.

FIG. 9 is a diagram showing a state of a zone boundary portion of a zone $Z_i$ and a next zone $Z_{i+1}$ on the disk surface which was CDR formatted in the invention. According to the first embodiment of the invention, a dead space 102 including at least one dummy track 104 is provided between the zone $Z_i$ and the next zone $Z_{i+1}$.

In the state of the CDR format, an ID section and a data section of each track included in each of the zones $Z_i$ and $Z_{i+1}$ are arranged at the same position. Data such as an address and the like is written only once in the ID section by the CDR format upon shipping from a factory. After that, the writing operation is not performed but only the reading operation is executed to the ID section. On the other hand, the reading and writing operations are frequently repetitively performed to the data section during the use of the apparatus. Since the positions of the ID section and the data section on each track in the zone are aligned in each of the zones $Z_i$ and $Z_{i+1}$, even when the reading or writing operation is performed to the data section, no influence is exerted on the adjacent ID section. However, since the number of sectors differs every zone in the tracks adjacent to the boundary of the zones $Z_i$ and $Z_{i+1}$, adjacently to the data section of one zone, the ID section of the other zone is located. In such a case, the reading or writing operation of the data section of one zone exerts an adverse influence on the ID section of the other zone. According to the invention, therefore, the dead space 102 including at least one dummy track 104 is provided in the boundary portion of the zones $Z_i$ and $Z_{i+1}$. In other words, since the dead space 102 including one dummy track is provided in the zone boundary portion, even when the data section and the ID section at the zone boundary are neighboring, the reading or writing operation of the data section doesn't exert an influence on the ID section. A width of dead space between the tracks in the zone can be narrowed by only a value corresponding to a point that there is no need to consider the interference at the zone boundary.

Figure 10:
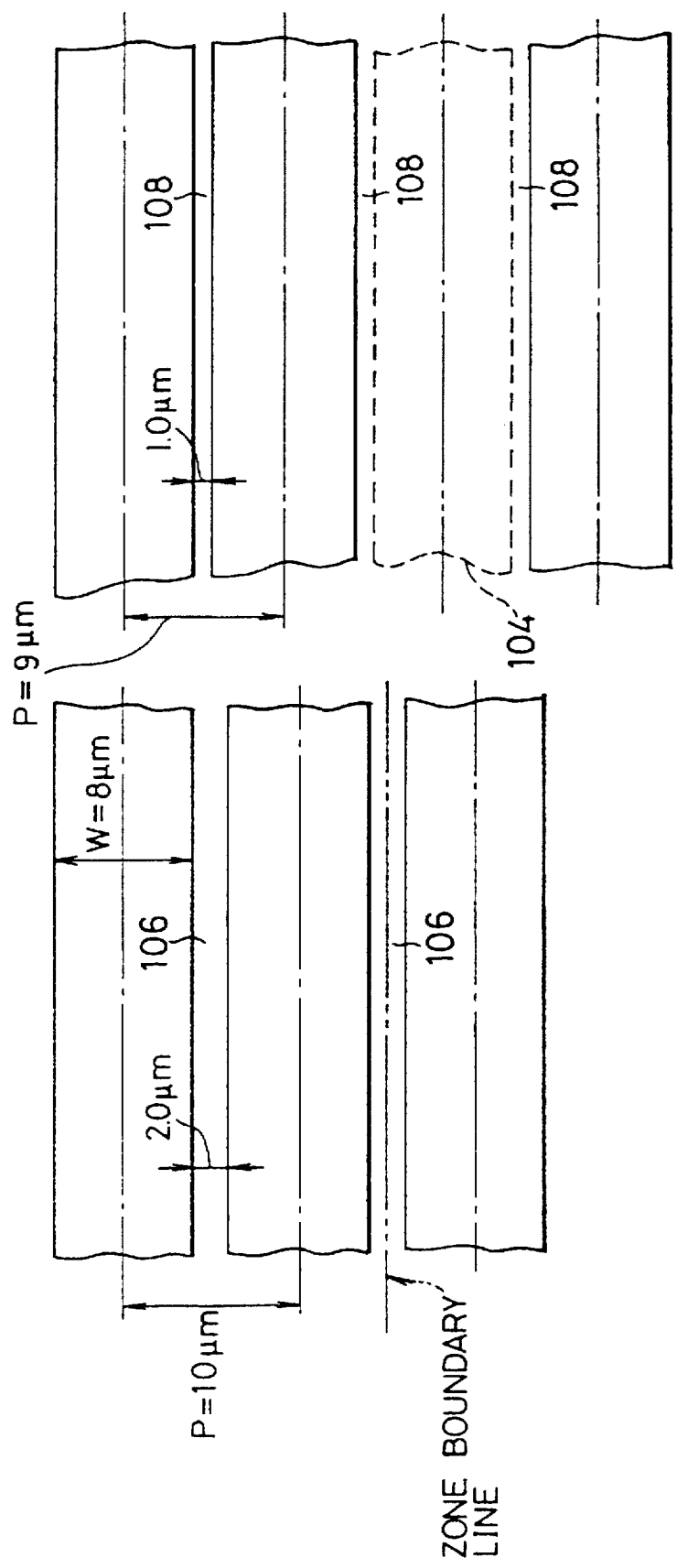
FIGS. 10A and 10B are explanatory diagrams of an improvement and effect of a track pitch according to the invention in comparison with the conventional one.

FIG. 10B shows an effect due to the reduction of the track pitch by the CDR format of the invention in comparison with a conventional example of FIG. 10A. In this case, the diagrams are shown with respect to the case of a magnetic disk of 3.5 inches having a medium use width of 30 mm as an example and the CDR zone is divided into ten portions. In the conventional example of FIG. 10A, a width of dead space between the tracks is set to 2.0 µm in consideration of the influence at the zone boundary in order to prevent the influence on the ID section by the reading or writing operation to the data section of the track adjacent to the portion of a zone boundary 106. A track width W is set to W=8 µm in accordance with the core width of the write head. Therefore, when the dead space of 2.0 µm is formed, a track pitch P is equal to P=10 µm. Thus, the number of tracks which can be used in a conventional article is equal to (medium use width)/(track pitch) =
(30 × 10$^{-3}$m)/(track pitch 10 × 10$^{-6}$m) =
3000 tracks On the other hand, in the CDR format of the invention of FIG. 10B, the dead space 102 including one dummy track 104 is provided in the portion of the zone boundary. Therefore, there is no need to consider the influence between the ID section and the data section in each zone, a width of dead space 108 between the tracks can be reduced to 1.0 µm that is equal to half of 2.0 µm in the conventional one. Accordingly, as the width of the dead space in the invention may be reduced to one half of that found in a conventional article, the dead space of the invention may be set to a value of about ⅒ to ⅛ of the track width W (whereas in the conventional article, the width of the dead space is ordinarily set to about ⅕ to ¼ of the track width). Thus, the track pitch P can be set to 9 µm that is smaller by only a value of the narrow dead space. Consequently, the number of tracks which can be used on the disk medium according to the invention in FIG. 10B is equal to (medium use width)/(track pitch) =
(30 × 10$^{-3}$m)/(9 × 10$^{-6}$m) =
3324 tracks Further, since the disk medium is divided into ten CDR zones, there are nine zone boundaries. Portions corresponding to nine tracks for the dead spaces provided at the zone boundaries cannot be used as dummy tracks. Thus, the number of tracks which can be finally used is equal to 3324−9=3315 tracks In case of the invention, the recording density can be raised by 10% or more as compared with that of the conventional article. FIG. 9 shows the case where the dummy track 104 was formatted in the dead space 102 at the zone boundary. However, in case of using the servo surface servo for the positioning control of the head, there is no need to format the dummy track 104 serving as a data surface. On the other hand, in case of performing the head positioning control by the sector servo in which the servo information is provided on only the data surface, although there is no need to format the ID section with respect to the dummy track 104, the servo pattern has to be certainly formatted.

Figure 11:
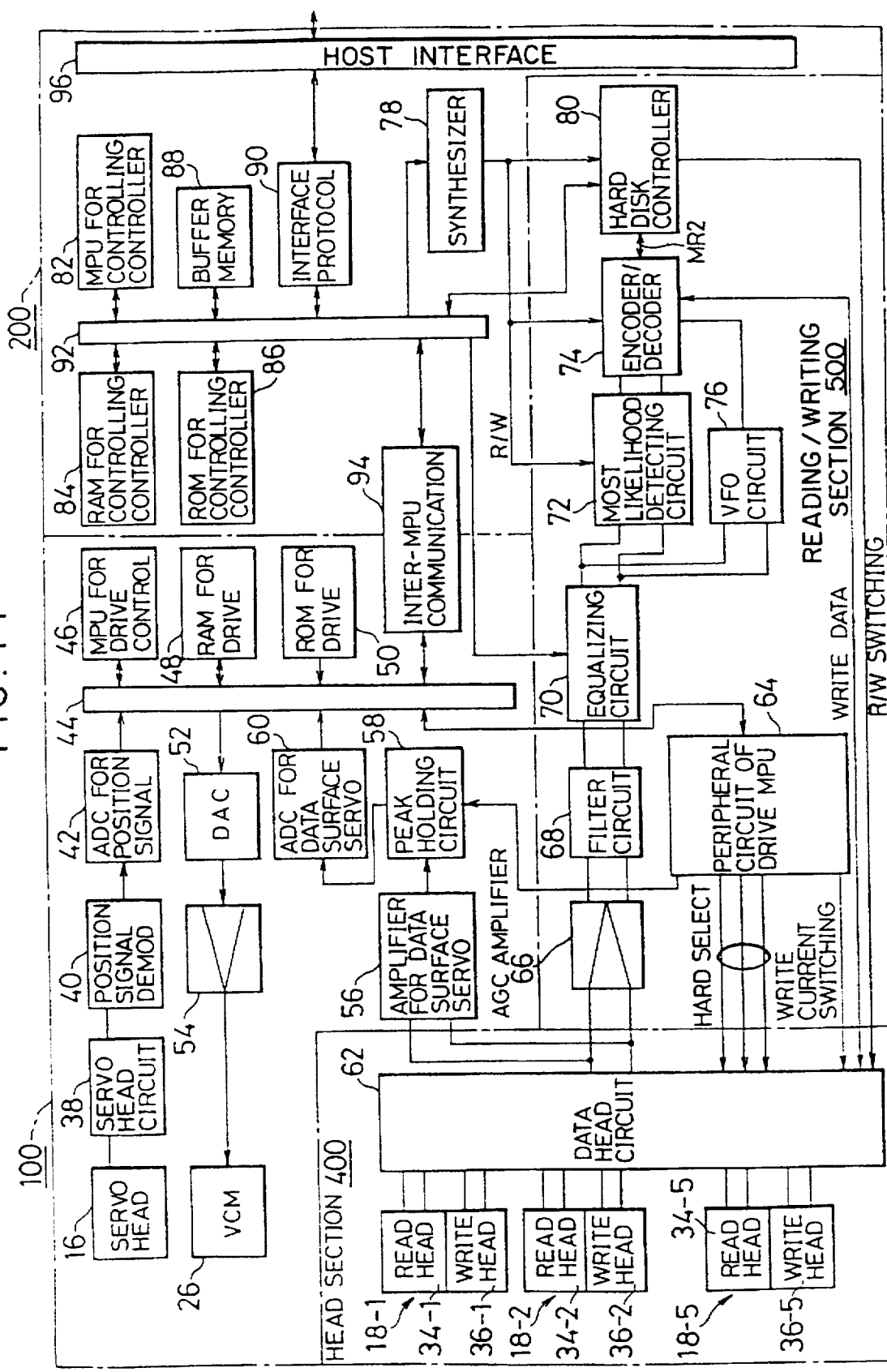
FIG. 11 is a block diagram showing a hardware construction of the invention.

FIG. 11 shows the details of a hardware construction of the magnetic disk apparatus of the invention in which a disk medium having a dead space including one track at the zone boundary shown in FIG. 9 is used. The magnetic disk apparatus of the invention is constructed by the drive control section 100, disk controller 200, head section 400, and reading/writing section 500 in FIG. 6. The drive control section 100 will be first explained. A servo signal from the servo head 16 provided in correspondence to the servo surface of the disk medium is processed by a servo head circuit 38 in an analog manner. The processed signal linearly increases in a range of the track width in accordance with the head position by a position signal demodulating circuit 40 and the position signal which is inverted each time the head traverses the track is demodulated. The analog position signal demodulated by the position signal demodulating circuit 40 is converted to the digital data by an A/D converter 42 for the position signal and is supplied to an MPU 46 for drive control through an MPU bus 44. An RAM 48 for driving and an ROM 50 for driving in which a control program for driving has been stored are connected to the MPU 46 for drive control through the MPU bus 44. The MPU 46 for drive control performs a seeking operation according to a seek command notified from the upper disk controller 200 and an on-track operation after completion of the seeking operation. In the seeking operation, a cylinder address for positioning the head is set to the MPU 46. In the invention, when the cylinder address indicative of a seek destination is set, a check is made to see if the head passes through the zone boundary during the seeking operation or not. When the head passes through the zone boundary, a correction to add or subtract the track address corresponding to one track provided in the dead space at the zone boundary is executed. In the case where a plurality of tracks in the same cylinder are sequentially processed by the head switching operation by continuously writing or reading the data blocks in the on-track state, or in the case where the data is continuously processed by the switching between the cylinders, a track skew value or a cylinder skew value which is necessary for the track switching is calculated on the basis of a format command at the time of the start of the use of the apparatus with respect to each of the above cases.

The drive data calculated by the MPU 46 in the seeking operation or on-track operation is converted into the analog voltage by a D/A converter 52 and is amplified by a power amplifier 54. After that, it is supplied to the VCM 26.

Further, an amplifier 56 for data surface servo, a peak holding circuit 58, and an A/D converter 60 for data surface servo are provided in the drive control section 100 as circuits for processing the servo information stored on the data surface, for example, outermost track of the disk medium. As shown in FIG. 7, in the process using the servo information on the data surface, the head positioning at the data surface in the disk media 10-2 to 10-4 is performed on the basis of the servo information of the servo surface 20 of another disk medium 10-1. A displacement of the position of the data surface for the reference position of the physical servo surface 20 is caused by a temperature change when using the apparatus. Therefore, the servo information recorded on the outermost tracks of the data surfaces 22-1 to 22-5 is read out by the time management at the start of the apparatus and from the start of the apparatus. An offset corresponding to one circumference is stored in the driving RAM 48. In the subsequent on-track control, the head position is corrected by using the offset.

The disk controller 200 will now be described. An MPU 82 for controlling the controller is provided for the disk controller 200. An RAM 84 for controlling the controller, an ROM 86 for controlling the controller, a data buffer memory 88, an interface protocol section (SCSI or the like) 90, a synthesizer 78, and an inter-MPU communicating section 94 are connected to an MPU bus of the MPU 82 for controlling the controller. The MPU 82 for controlling the controller receives a command and command data from a host computer through a host interface 96 and the interface protocol section 90 and controls the drive control section 100, head section 400, and reading/writing section 500 on the basis of the result of the analysis. For example, when the MPU 82 receives a write command from the host computer, the MPU 82 notifies a seek command and a target cylinder address to the MPU 46 for drive control via the inter-MPU communicating section 94, thereby allowing the seeking operation to be executed. After the seek command was issued, when a device end indicative of the completion of the seeking operation is derived from the MPU 46 of the drive control section 100, the head is switched in order to write data to a special track in the designated cylinder address by a data head circuit 62 of the head section 400, thereby selecting the corresponding data head. At the same time, the reading/writing section 500 is activated and the write data which has already been received is transferred and written from the host computer into the data buffer memory 88.

When the MPU 82 for controlling the controller receives a read command, the MPU 82 similarly generates the seek command and the cylinder address to the drive control section 100. By receiving a seek completion response, the head switching operation by the data head circuit 62 of the head section 400 and the reading operation by the reading/writing section 500 are executed. The read data is stored into the data buffer memory 88. After that, the read data is transferred to the host computer.

Further, in the magnetic disk apparatus of the invention using the CDR format, the clock frequency which is used differs every zone. Therefore, frequency division data or the like to obtain the clock frequency corresponding to the access zone is read out from a table and is set into the synthesizer 78 provided in the disk controller 200. A clock frequency of the read clock or write clock for the reading/writing section 500 is controlled to a frequency adapted to the zone.

The head section 400 will now be described. In the embodiment, five data heads 18-1 to 18-5 are provided for the head section 400. The data heads 18-1 to 18-5 are constructed by read heads 34-1 to 34-5 and write heads 36-1 to 36-5, respectively. Magnetic heads are used as write heads 36-1 to 36-5. MR heads using magnetoresistive devices are used as read heads 34-1 to 34-5. The MR head can be sufficiently miniaturized as compared with the magnetic head. A core width of each track in the CDR format of the disk medium in FIG. 9 is determined in accordance with core widths of the larger write heads 36-1 to 36-5. For example, the core width W=8 μm as shown in FIG. 10B. The data head circuit 62 receives a head selection signal from a drive MPU peripheral circuit 64 provided in the reading/writing section 500 and switches either one of the data heads 18-1 to 18-5 and connects the corresponding write head or read head. By receiving a switching control signal of the reading/writing operation from the reading/writing section 500 side, the read head and write head are switched and selected. Further, in the writing operation, a switching control of a write current is performed by the drive MPU peripheral circuit 64. The data head circuit 62 is generally prepared as a head IC.

The reading/writing section 500 will now be described. A hard disk controller 80 is provided for the reading/writing section 500 and transmits and receives data to/from the data buffer memory 88 provided for the disk controller 200 and performs a whole control of the reading operation or writing operation. An analog read signal derived from the head section 400 is amplified by an AGC amplifier 66. After that, the signal passes through a filter circuit 68 and its waveform is equalized by an equalizing circuit 70. The resultant signal is supplied to a most likelihood detecting circuit 72 and a VFO circuit 76. Outputs of the most likelihood detecting circuit 72 and VFO circuit 76 are supplied to an encoder/decoder 74 which has been switched to the decoding side in the reading mode and the read data is reconstructed. The read data is transferred to the data buffer 88 of the disk controller 200 via the hard disk controller. In the writing operation, the write data is read out from the data buffer memory 88 via the hard disk controller 80. The write data is supplied to the encoder/decoder 74 which has been switched to the encoding side in the writing mode. The write data is subjected to processes such as conversion into the 2-7 run length code or the like, addition of an ECC check code, and the like. After that, the processed signal is supplied to the write head in the data head selected at that time via the data head circuit 62 of the head section 400.

Figure 12:
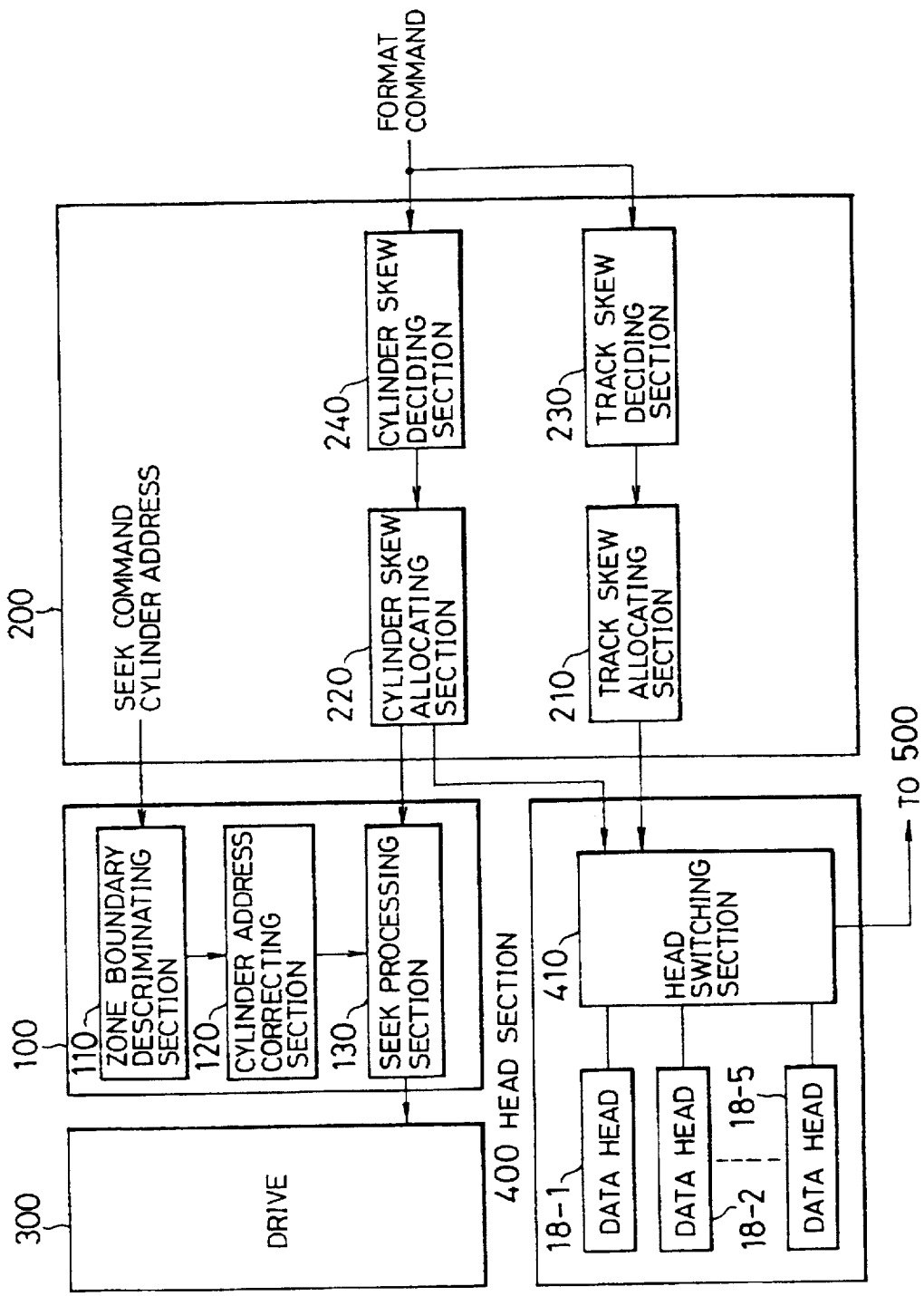
FIG. 12 is a block diagram of a functional construction of the invention.

FIG. 12 shows functions which are peculiar to the invention and are necessary to read and write the disk medium having the CDR format provided with the dead space 102 including one track at the zone boundary in FIG. 9. A zone boundary discriminating section 110, a cylinder address correcting section 120, and a seek processing section 130 are provided for the drive control section 100. In the reading or writing mode, the seek command and the cylinder address are supplied to the zone boundary discriminating section 110 via the disk controller 200. By receiving the supply of the cylinder address, the zone boundary discriminating section 110 discriminates whether the head passes through the zone boundary when the head is moved from the cylinder address at which the head is at present located to the cylinder address instructed by the seek command or not. When the head doesn't pass through the zone boundary, the received cylinder address is directly set into the seek processing section 130 without correcting by the cylinder address correcting section 120. On the other hand, when it is judged that the head has passed through the zone boundary, the cylinder address correcting section 120 executes a correction for adding or subtracting the cylinder address in accordance with the number of passing times of the zone boundary. The corrected new cylinder address is set into the seek processing section 130.

FIG. 13 shows the general contents of a conversion table which is used for correction of the cylinder address by the cylinder address correcting section 120 in FIG. 12. As for the zone numbers, $Z_i$ to $Z_n$ are supplied as indices in accordance with the numbers (1 to m) of zones. Since dummy cylinders as many as a predetermined number of tracks are arranged in empty spaces (dead spaces) of the zone boundaries among the zones, the number of dummy cylinders is expressed by $\alpha$.

First, a physical cylinder address including tracks in the empty spaces at the zone boundaries among the zones $Z_1$ to $Z_n$ is continuously increased one address by one when assuming that the number of cylinders per each zone is equal to (m) and the number of cylinders of the empty spaces at the zone boundaries is equal to $\alpha$. On the other hand, with respect to a logical cylinder address for actually reading or writing data, continuous cylinder addresses excluding the physical cylinder addresses which belong to the empty spaces at the zone boundaries are used. The logical cylinder address is used as a cylinder address in association with the seek command from the upper apparatus. Therefore, in the drive control section 100 in FIG. 12, the logical cylinder address received in accordance with the conversion table in FIG. 13 has to be converted to the physical cylinder address in consideration of the number of dummy cylinders provided in the empty spaces at the zone boundaries.

FIG. 14 shows a conversion table of the logical cylinder addresses and physical cylinder addresses in the case where the dummy cylinder number $\alpha$ in the empty spaces provided at the zone boundaries per one zone is set to $\alpha=1$ for the general address conversion table in FIG. 13. As will be obviously understood from the conversion table, for the continuous logical cylinder addresses which are supplied from the upper apparatus, each time the head passes through the zone boundary, the physical cylinder address is converted to the correction address which has been increased by only $\alpha=1$. In case of seeking from the large zone number to the small zone number, each time the head passes through the zone, the physical cylinder address in which the logical cylinder address has been decreased by "1" is set.

Figure 15:
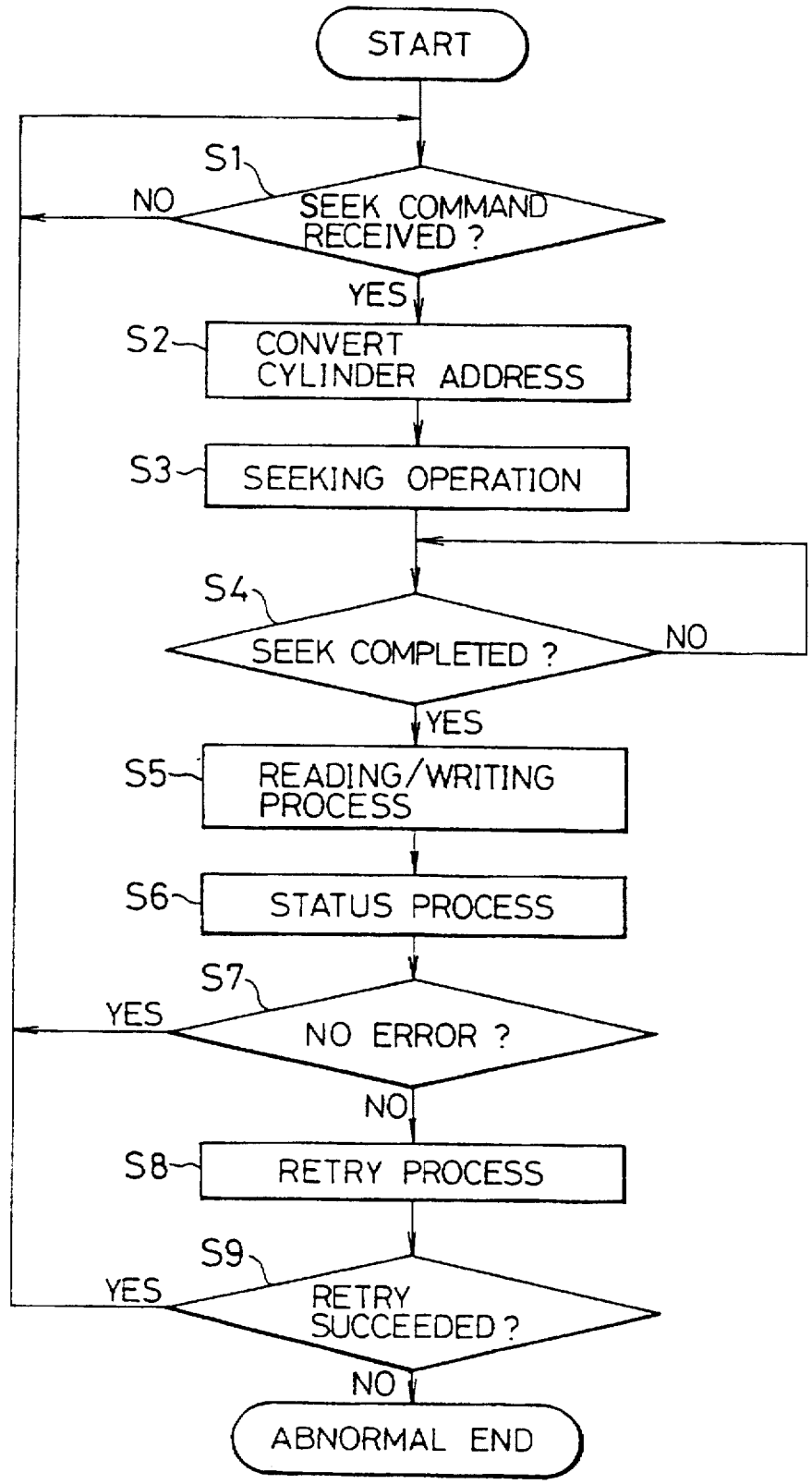
FIG. 15 is a flowchart for a processing operation of the invention.

A flowchart of FIG. 15 shows the seeking operation and reading/writing operations in the magnetic disk apparatus of the invention in which the correction of the cylinder address is accompanied every zone passage. First in step S1, the presence or absence of the reception of the seek command is judged. When the seek command is received, in step S2, the logical cylinder addresses received in association with the seek command are converted to the physical cylinder addresses by using the conversion table in FIG. 13 or 14. In step S3, the seeking operation to move the head to the converted physical cylinder address is executed. When the completion of the seeking operation is judged in step S4, step S5 follows and the reading or writing process is executed. When the reading or writing process is finished, a status process is performed in step S6. When there is no error in step S7, the processing routine is finished as a normality and the apparatus waits for the reception of the next seek command. If there is an error in step S7, a retrying process is executed in step S8. When a retry is succeeded in step S9, the processing routine is again returned to step S1 and the apparatus waits for the next seek command. If the retry fails, the processing routine is finished as an abnormality.

Referring again to FIG. 12, as functions which are peculiar to the magnetic disk apparatus of the invention in association with that the dead space 102 including at least one dummy track is provided at the zone boundary in FIG. 9, a track skew allocating section 210, a cylinder skew allocating section 220, a track skew deciding section 230, and a cylinder skew deciding section 240 are provided in the disk controller 200.

Figure 16:
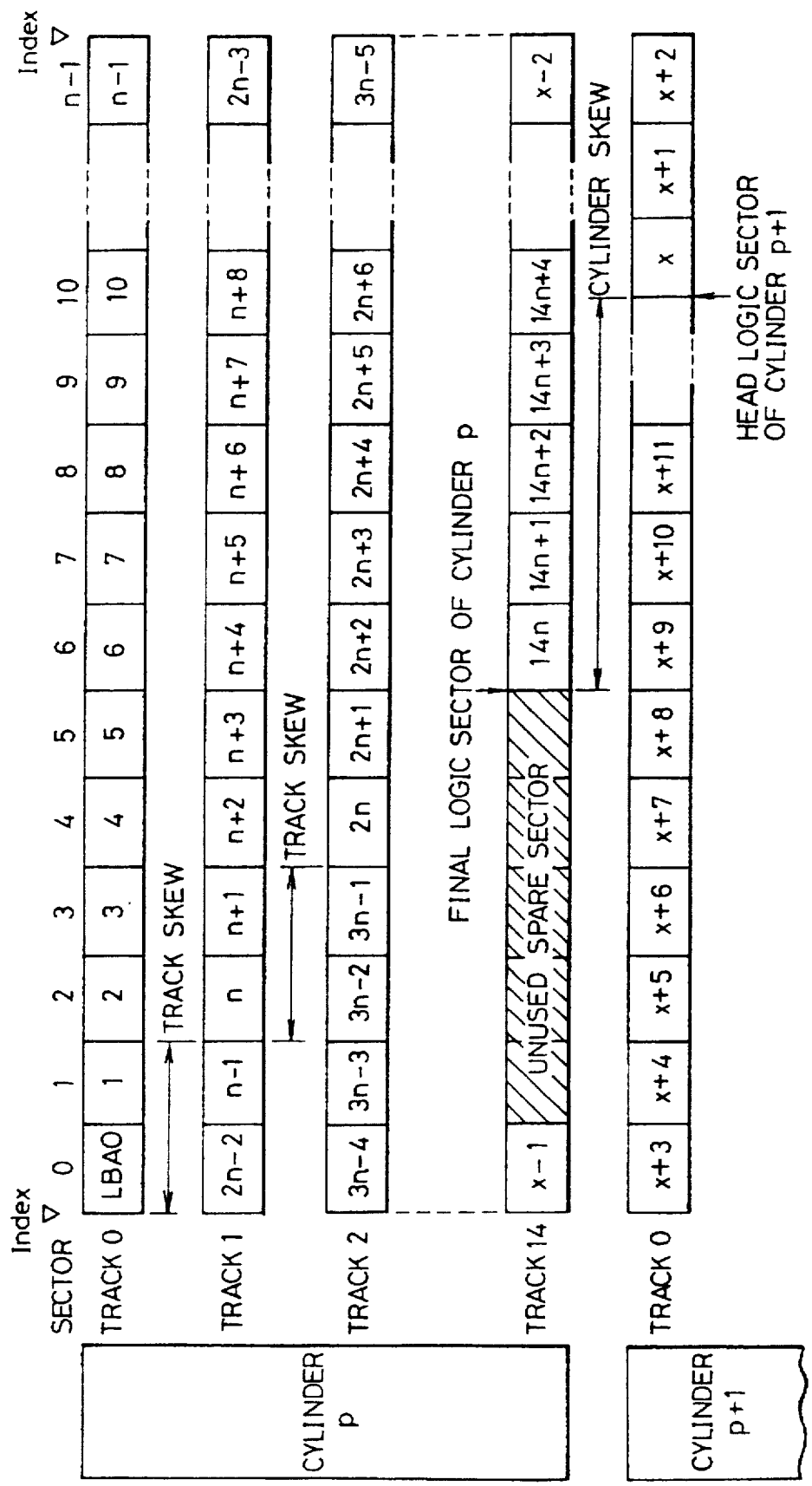
FIG. 16 is an explanatory diagram of a track skew and a cylinder skew for use in the track switching in the same zone.

FIG. 16 shows track skews and cylinder skews in the cylinders (p) and (p+1) included in the same zone. Since the cylinder (p) and the next cylinder (p+1) belong to the same zone, the reading and writing operations are executed by the same clock frequency, so that sector lengths of the cylinders (p) and (p+1) are equal as shown in the diagram. The cylinder (p) has 15 tracks shown by track Nos. 0 to 14 and is divided into (n) sectors in dependence on the clock frequency of the zone.

Although the track switching operation in the same cylinder (p) is executed by the head switching, in order to avoid that a waiting of one rotation occurs due to the reading or writing operation of the next track by the time which is required for such a head switching, the head logical sectors of the tracks 0 to 14 are deviated by only the track skew value that is defined as the number of sectors corresponding to the switching time and are allocated. With respect to the switching from the final logical sector as a last sector of the unused spare sectors at the end of the cylinder (p) to a head logical sector (x) of the head track 0 of the next cylinder (p+1), the seeking operation of one track and the head switching for the cylinder switching are accompanied. To avoid the occurrence of the waiting of one rotation due to the time which is required for the head switching, the head logical sector (x) in the head track of the cylinder (p+1) is deviated to the back by only the cylinder skew value defined as the number of sectors corresponding to the switching time and is allocated. With respect to such track skews and cylinder skews in the same zone in FIG. 16 as mentioned above, they are also similarly applied to the conventional apparatus.

Figure 17:
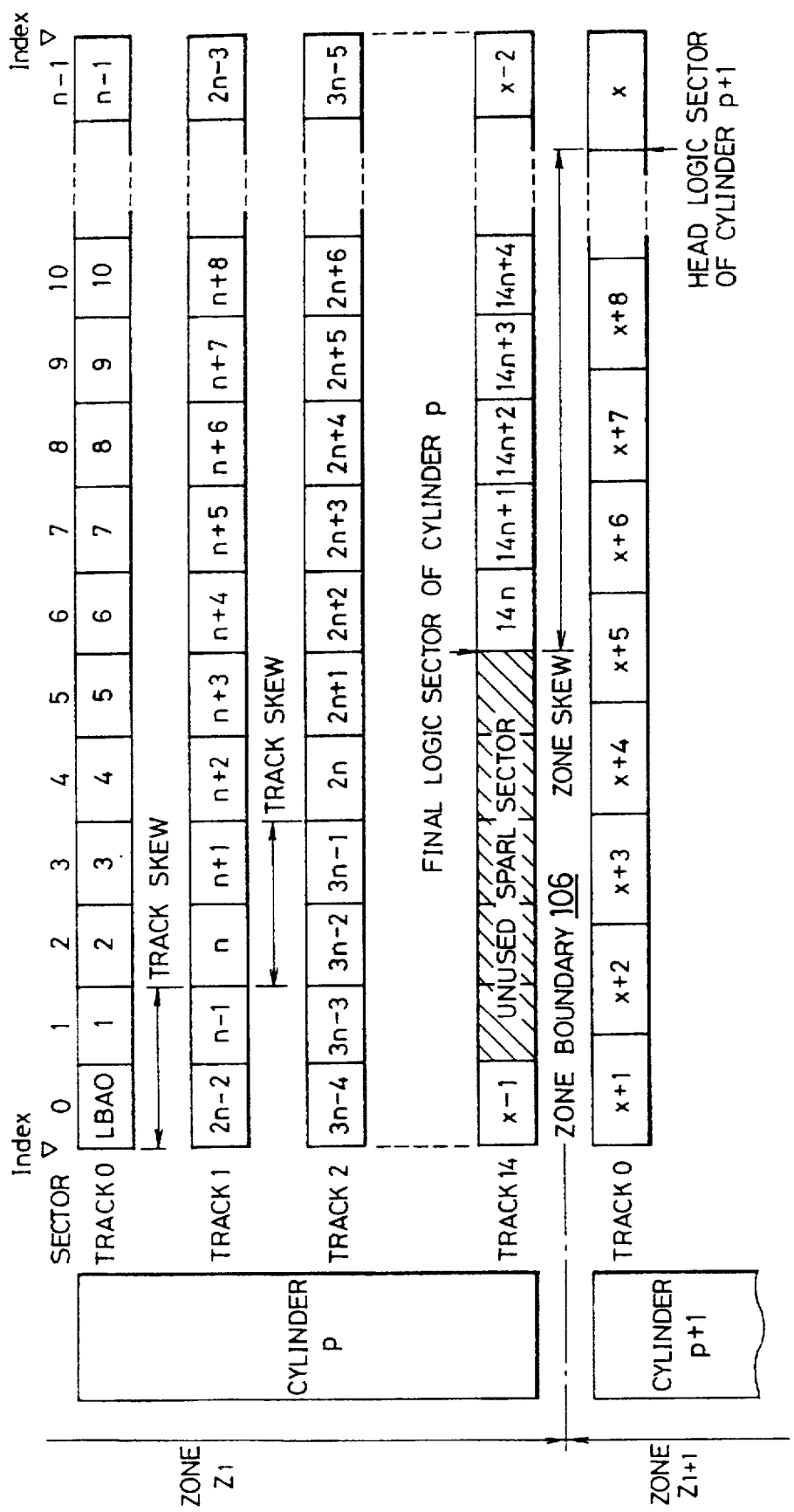
FIG. 17 is an explanatory diagram of a zone skew for use in the track switching passing through a zone boundary.

On the other hand, according to the invention, as shown in FIG. 17, in the case where the cylinder (p) and the next cylinder (p+1) belong to the different zones $Z_i$ and $Z_{i+1}$ and the cylinder switching is executed while passing through the zone boundary 106, for example, as shown in FIG. 9, the dead space 102 including one dummy track 104 is provided in the region of the zone boundary 106. Therefore, the cylinder skew in the zone differs. Namely, the cylinder skew passing through the zone boundary 106 is defined as a zone skew. As for the zone skew, the switching time including the passage of the dummy cylinder provided at the zone boundary is obtained. With respect to the calculation of the number of sectors which provides the zone skew value, the zone switching time is calculated by using the one-sector time which is determined by the clock frequency which is used in the next zone $Z_{i+1}$. Specifically speaking, it is sufficient to obtain zone skew=(zone switching time+overhead time)÷(one-sector time of the next zone)

When a format command is issued from the host computer to the disk controller 200 in FIG. 12, each value of the track skew and cylinder skew of every zone in FIG. 16 and the value of the zone skew when passing through the zone shown in FIG. 17 as mentioned above are automatically calculated and stored in an RAM table. Due to this, the allocation of the track skews and the allocation of the cylinder skews including the zone skews can be properly performed.

Figure 18:
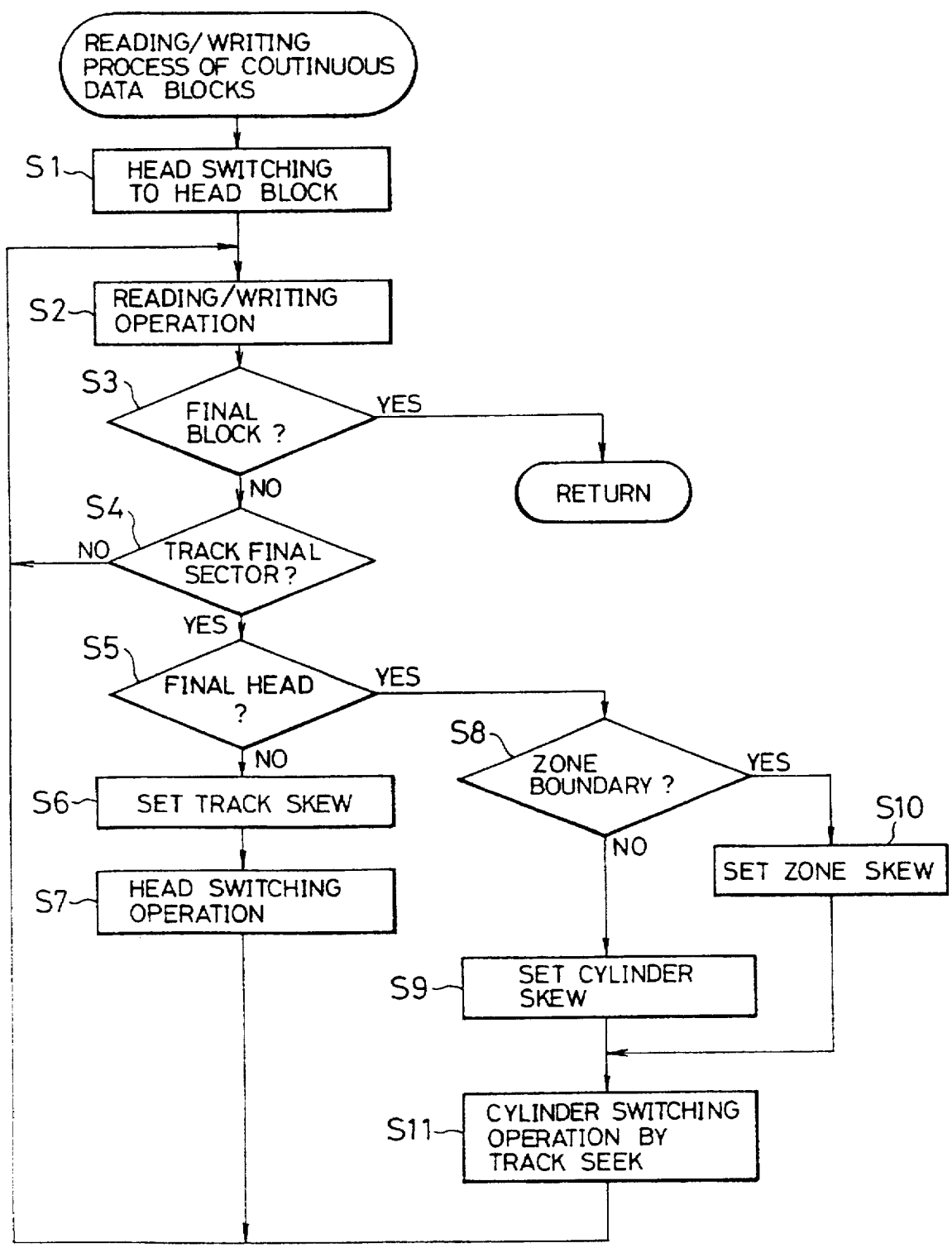
FIG. 18 is a flowchart for reading/writing processes of continuous blocks.

A flowchart of FIG. 18 shows the details of the reading/writing processes of the continuous data blocks in the invention. First in step S1, the head is switched to the head block of the head track in the on-track state of the head whose seeking operation has been completed. In step S2, the reading or writing operation is executed. In step S3, a check is made to see if the block is the final block or not. Processes in step S4 and subsequent steps are repeated until the final block. In step S4, a check is made to see if the sector is the final logical sector of the track which is at present being processed or not. When the head reaches the final logical sector, a check is made in step S5 to see if the track is the final track of the same cylinder or not. When the track is not the final track, the track skew which has been prepared is set in step S6. In step S7, the head switching operation is executed. In step S2, the reading or writing operation from the head logical sector of the next track is started. On the other hand, when the track is the final track of the same cylinder in step S5, a check is made in step S8 to see if the head is located at the zone boundary or not. If NO, the cylinder skew which has previously been obtained is set in step S9. In step S11, the cylinder switching operation by the head switching associated with the one-track seeking operation is performed. On the other hand, when the head is located at the zone boundary, step S8 follows and the prepared zone skew is set. In step S11, the cylinder switching operation due to the track seek including the dummy track provided at the zone boundary is performed.

Figure 19:
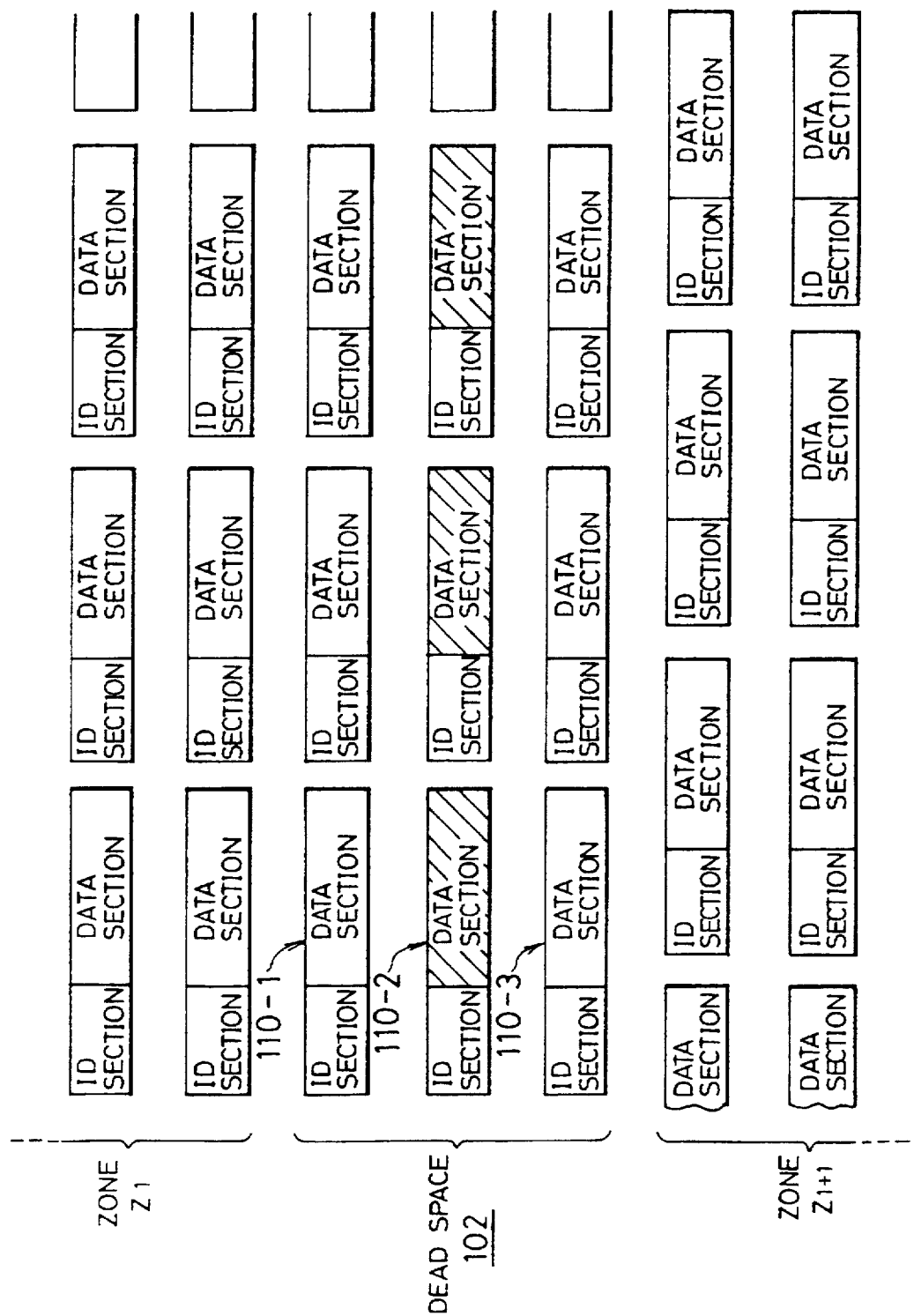
FIG. 19 is an explanatory diagram for a track format of the second embodiment according to the invention in which dummy tracks at the zone boundary are used as storage areas of control information.

FIG. 19 shows the second embodiment of the CDR format in the disk medium of the present invention. In the second embodiment, for example, three dummy tracks 110-1 to 110-3 are provided in the dead space 102 between the zone $Z_i$ and the next zone $Z_{i+1}$. The central dummy track 110-2 is used as a cylinder area to store proper data necessary to control and manage the magnetic disk apparatus other than the user data. For example, frequency division data which is used in a synthesizer that is necessary to control the clock frequency of every zone and the like have previously been written in the dummy track 110-2 in the dead space 102. When passing through the dead space 102, the frequency division data is read out and the clock frequency of the next zone can be also set. Management information and medium information which are peculiar to each zone can be also obviously stored. For instance, the writing of error information of each zone or the like can be used.

FIG. 20 shows the third embodiment of the CDR format in the disk medium of the invention. The third embodiment is characterized in that a space corresponding to the dummy tracks as in the first or second embodiment is not formed at the zone boundary between the zones $Z_1$ and $Z_{i+1}$ but a space of a width L2 which is slightly wider than a width L1 of the dead space 102 between the tracks in the zone is provided. It is sufficient that the width L2 of the dead space 102 is set to a value such that the ID section is not influenced by the reading or writing operation of the data section even when the data section and ID section of the neighboring zones $Z_i$ and $Z_{i+1}$ overlap. The width L2 of the dead space 102 can be narrowed more than the width of the dead space in the case where at least one dummy track is provided like the first or second embodiment. Thus, the number of tracks which can be used in the disk medium can be further increased. In the seek control in the third embodiment in which the dead space L2 has physically been determined, since the management of the cylinder address by the track address cannot be executed in the boundary portion, it is necessary to handle the dead space L2 as a physical amount and to execute the seek control at the zone boundary.

As mentioned above, even when the track pitch is narrowed in the magnetic disk apparatus using the CDR, a possibility such that the ID section and data section of the different zones overlap at the zone boundary and the ID section is broken by the reading or writing operation in the data section can be eliminated. A possibility of a breakage of the ID section in the zone section is eliminated. The dead space in the track can be narrowed, so that the number of tracks which can be used is improved and a high density recording can be performed. A capacity of the magnetic disk apparatus can be further increased.

The invention is not limited by the numerical values shown in the above embodiments. The disk apparatus can be also applied to any disk of a proper size such as 3.5 inches, 5.25 inches, 8 inches, or the like.

What is claimed is:

1. A magnetic disk apparatus comprising:
   a combination head constructed with a write head having a core width, and a read head integrally provided with said write head having a magneto-resistive element of a core width that is relatively narrower than the core width of said write head;
   a disk medium in which a plurality of tracks which can be magnetically read and written are formed in the circumferential direction, said tracks being divided into a plurality of zones in the radial direction and information is read and written with a constant linear density by using a clock signal of a different frequency every said zone, said disk medium further having a plurality of zone boundary spaces disposed between each said zone, each said zone boundary space corresponding to at least one said track, and wherein a dead space of at least one track width is provided between tracks in said zone boundary space;

a rotary actuator for positioning said combination head over said disk medium; and a drive unit for reading and writing the information, said drive unit including:

a track skew allocating section for allocating a head logical sector of the next track to the position after a final logical sector of the preceding track among the plurality of tracks belonging to the same cylinder while deviating by only a track skew value which is defined by the number of sectors corresponding to a switching time and for allowing the reading or writing operation to be executed;

a cylinder skew allocating section for allocating a head logical sector of a head track in the next cylinder to the position after a final logical sector of a final track in the preceding cylinder between the neighboring cylinders while deviating by only a cylinder skew value which is defined by the number of sectors corresponding to the switching time and for allowing the reading or writing operation to be executed;

a track skew value deciding section for deciding said track skew value on the basis of a one-sector time which is determined by a clock frequency of the zone to which each cylinder belongs at the time of the start of the use of the apparatus; and a cylinder skew value deciding section for deciding said cylinder skew value on the basis of a one-sector time and a one-track seeking time which are determined by the clock frequency of said zone with respect to the switching between the cylinders belonging to the same zone at the time of the start of the use of the apparatus and for deciding said cylinder skew value on the basis of a seeking time of a plurality of tracks including said dead space provided at the zone boundary and the one-sector time which is determined by the clock frequency of the next cylinder with respect to the switching between the neighboring cylinders which sandwich the zone boundary.

2. An accessing method of a magnetic disk apparatus in which a combination head includes a write head having a core width, and a read head integrally provided with said write head and having a magneto-resistive element of relatively narrow core width, said combination head being positioned by a rotary actuator, a disk medium having a plurality of tracks each of which has a track width that is determined by the core width of said write head and which can be magnetically read from and written to in the circumferential direction on said disk medium so as to have a dead space of ⅛ or less of the track width between said tracks, said tracks being further divided into a plurality of zones in the radial direction, with a zone boundary space corresponding to at least one track being formed at the boundary of each zone, wherein information is read and written with a constant linear density by using a clock signal of a different frequency every said zone, and further said dead space corresponding to at least one track is formed at the boundary of said each zone, comprising:

a seeking step of moving a magnetic head to a target cylinder position which is designated by a cylinder address instructed from an upper apparatus;

a boundary discriminating step of discriminating whether or not the head passes through said zone boundary by the seeking operation to the cylinder address position instructed from said upper apparatus;

a cylinder address correcting step of correcting the cylinder address instructed from the upper apparatus on the basis of the number of zone boundary spaces crossed by said combination head, and updating said target cylinder position in the case where the passage of said zone boundary or boundaries is judged;

a track skew allocating step of allocating a head logical sector of a next track to the position after a final logical sector of a preceding track among the plurality of tracks belonging to the same cylinder while deviating by only a track skew value which is defined by the number of sectors corresponding to a switching time and allowing the reading or writing operation to be executed;

a cylinder skew allocating step of allocating a head logical sector of a head track in a next cylinder to the position after a final logical sector of a final track in a preceding cylinder between the adjacent cylinders while deviating by only a cylinder skew value which is defined by the number of sectors corresponding to a switching time and allowing the reading or writing operation to be executed;

a track skew value deciding step of deciding said track skew value on the basis of a one-sector time which is determined by a clock frequency of the zone to which each cylinder belongs at the time of the start of the use of the apparatus; and a cylinder skew value deciding step of deciding said cylinder skew value on the basis of a one-sector time and a one-track seeking time which are determined by the clock frequency of said zone with respect to a switching between the cylinders belonging to the same zone at the time of the start of the use of the apparatus and deciding said cylinder skew value on the basis of a seeking time corresponding to a plurality of tracks including the dead space formed at the zone boundary and a one-sector time which is determined by a clock frequency of a next cylinder with respect to the switching between the neighboring cylinders which sandwich the zone boundary.

3. An accessing method of a magnetic disk apparatus in which a combination head includes a write head having a core width, and a read head integrally provided with said write head and having a magneto-resistive element of relatively narrow core width, said combination head being positioned by a rotary actuator, a disk medium having a plurality of tracks each of which has a track width that is determined by the core width of said write head and which can be magnetically read from and written to in the circumferential direction on said disk medium, said tracks being further divided into a plurality of zones in the radial direction, with a zone boundary space corresponding to at least one track being formed at the boundary of each zone, wherein information is read and written with a constant linear density by using a clock signal of a different frequency every said zone, and further a dead space corresponding to at least one track is formed at the boundary of said each zone, comprising:

a seeking step of moving a magnetic head to a target cylinder position which is designated by a cylinder address instructed from an upper apparatus;

a boundary discriminating step of discriminating whether or not the head passes through said zone boundary by the seeking operation to the cylinder address position instructed from said upper apparatus;

a cylinder address correcting step of correcting the cylinder address instructed from the upper apparatus on the basis of the number of zone boundary spaces crossed by said combination head, and updating said target cylinder position in the case where the passage of said zone boundary or boundaries is judged;

a track skew allocating step of allocating a head logical sector of a next track to the position after a final logical sector of a preceding track among the plurality of tracks belonging to the same cylinder while deviating by only a track skew value which is defined by the number of sectors corresponding to a switching time and allowing the reading or writing operation to be executed;

a cylinder skew allocating step of allocating a head logical sector of a head track in a next cylinder to the position after a final logical sector of a final track in a preceding cylinder between the adjacent cylinders while deviating by only a cylinder skew value which is defined by the number of sectors corresponding to a switching time and allowing the reading or writing operation to be executed;

a track skew value deciding step of deciding said track skew value on the basis of a one-sector time which is determined by a clock frequency of the zone to which each cylinder belongs at the time of the start of the use of the apparatus; and a cylinder skew value deciding step of deciding said cylinder skew value on the basis of a one-sector time and a one-track seeking time which are determined by the clock frequency of said zone with respect to a switching between the cylinders belonging to the same zone at the time of the start of the use of the apparatus and deciding said cylinder skew value on the basis of a seeking time corresponding to a plurality of tracks including the dead space formed at the zone boundary and a one-sector time which is determined by a clock frequency of a next cylinder with respect to the switching between the neighboring cylinders which sandwich the zone boundary.

* * * * *

UNITED STATES PATENT AND TRADEMARK OFFICE
CERTIFICATE OF CORRECTION

PATENT NO.    : 5,784,220
DATED         : July 21, 1998
INVENTOR(S)   : Nishimura et al.

It is certified that error appears in the above-identified patent and that said Letters Patent is hereby corrected as shown below:

On the title page ,

Column 4, line 3, delete "in-a" and insert

--in a-- therefor

Column 15, line 10, delete "alter" and insert

--after-- therefor

Signed and Sealed this

Fourth Day of May, 1999

Attest:

Q. TODD DICKINSON

*Attesting Officer*   Acting Commissioner of Patents and Trademarks